US012139356B2

(12) United States Patent
Bosich

(10) Patent No.: US 12,139,356 B2
(45) Date of Patent: Nov. 12, 2024

(54) MATERIAL HANDLING SYSTEM AND METHOD AND LOAD CARRYING VEHICLE THEREOF

(71) Applicant: Milan Edgar Bosich, Forrestdale (AU)

(72) Inventor: Milan Edgar Bosich, Forrestdale (AU)

(73) Assignee: Milan Edgar Bosich, Forrestdale (AU)

( * ) Notice: Subject to any disclaimer, the term of this patent is extended or adjusted under 35 U.S.C. 154(b) by 355 days.

(21) Appl. No.: 17/637,927

(22) PCT Filed: Aug. 14, 2020

(86) PCT No.: PCT/AU2020/050852
§ 371 (c)(1),
(2) Date: Feb. 24, 2022

(87) PCT Pub. No.: WO2021/026616
PCT Pub. Date: Feb. 18, 2021

(65) Prior Publication Data
US 2023/0348212 A1    Nov. 2, 2023

(30) Foreign Application Priority Data

Aug. 14, 2019 (AU) ................................ 2019902944
Feb. 24, 2020 (AU) ................................ 2020900527
Jul. 8, 2020 (AU) ................................ 2020902357

(51) Int. Cl.
*B65G 67/32* (2006.01)
*B60P 7/08* (2006.01)
(Continued)

(52) U.S. Cl.
CPC ............ *B65G 67/32* (2013.01); *B60P 7/0807* (2013.01); *B65D 88/56* (2013.01); *B65G 65/23* (2013.01); *B60P 1/6418* (2013.01); *B65G 11/026* (2013.01)

(58) Field of Classification Search
CPC ........ B65G 67/50; B65G 67/32; B65G 67/46; B65G 67/48; B65G 67/56; B65G 67/34; B65G 67/42; B65G 67/54; B65G 65/23
See application file for complete search history.

(56) References Cited

U.S. PATENT DOCUMENTS 4,609,321 A * 9/1986 Binzen .................. B65G 67/50
414/303
4,655,401 A * 4/1987 Binzen .................. B65G 67/50
241/189.1
(Continued)

FOREIGN PATENT DOCUMENTS

CN         115557274 A  *  1/2023
DE          19851664 A1 *  5/2000  ............... B61D 9/14
WO    WO-2021026616 A1 *  2/2021  ............ B60P 1/6409

*Primary Examiner* — Kaitlin S Joerger
(74) *Attorney, Agent, or Firm* — Williams Mullen; F. Michael Sajovec

(57) ABSTRACT

An unloading apparatus for unloading a load contained in a tray of a load carrying vehicle having a transporter adapted to releasably receive the tray, the unloading apparatus comprising a rotator having a support surface for parking of the load carrying vehicle according to the second aspect of the invention, and a plurality of frames arranged in a spaced apart relationship with respect to each other along the support surface, the frames being adapted to secure the tray to the rotator and lifting the tray from the transporter, and means for rotating the rotator about the longitudinal axis of the tray for unloading of the load. There is also provide a load carrying vehicle including a transporter and a tray releasably attached to the transporter as well as a system and method from loading load from a first location into the tray and unloading the load at a second location using the unloading apparatus.

34 Claims, 19 Drawing Sheets

(51) Int. Cl.
*B65D 88/56* (2006.01)
*B65G 65/23* (2006.01)
*B60P 1/64* (2006.01)
*B65G 11/02* (2006.01)

(56) References Cited

U.S. PATENT DOCUMENTS

| | | | | |
|---|---|---|---|---|
| 5,046,912 | A | * | 9/1991 | Bostrom ................ B65G 67/50 |
| | | | | 414/358 |
| 5,906,417 | A | * | 5/1999 | Golden ................... B60P 1/165 |
| | | | | 296/183.2 |
| 2017/0341882 | A1 | * | 11/2017 | Dowiak ................ B65G 67/50 |

* cited by examiner

MATERIAL HANDLING SYSTEM AND METHOD AND LOAD CARRYING VEHICLE THEREOF

CROSS-REFERENCE TO RELATED APPLICATIONS

This application is a U.S. National Stage of International Application No. PCT/AU2020/050852 filed on Aug. 14, 2020, which claims priority to AU application Ser. No. 2020902357, filed on Jul. 8, 2020, claiming priority to AU application Ser. No. 2020900527, filed on Feb. 24, 2020, claiming priority to AU application Ser. No. 2019902944, filed on Aug. 14, 2019, the disclosures of which are incorporated herein by reference as if set forth in their entireties.

TECHNICAL FIELD

The present invention relates to load carrying vehicles and methods for unloading the vehicles.

The invention has been devised particularly, although not necessarily solely, in relation to transporters and trays thereof for handling of load.

BACKGROUND ART

The following discussion of the background art is intended to facilitate an understanding of the present invention only. The discussion is not an acknowledgement or admission that any of the material referred to is or was part of the common general knowledge as at the priority date of the application.

Handling of relative heavy and voluminous loads (such as sand, gravel, ores or demolition waste) for (for example) moving the load from a particular location to another location is conducted via load carrying vehicles comprising trays for receiving the load and moving the vehicles to another location where the load will be unloaded for discharge or for use at that location.

Examples of load carrying vehicles are dump trucks having trays pivotally mounted on the rear trailers of the vehicles.

A particular arrangement of such a dump truck comprises a tray that is hinged at the rear of the truck permitting selectively moving the tray between a lowered condition, allowing loading of the load into the tray, and a raised condition for discharging the load from the rear of the tray during pivoting of the tray towards the raised condition.

Another arrangement of a dump truck comprises a side dump tray mounted on the rear trailer of the truck such that the tray may be pivoted to one or the two sides. This particular arrangement of dump truck comprises on its rear trailer spaced apart upstanding mounts. These mounts are adapted for pivotally attaching the rear and front ends of the trays to the upper end of the mounts. The fact that the ends of the tray are pivotally attached to the ends of the mounts permits tilting the tray about its longitudinal axis moving the upper open end of the tray to the sides for unloading the load to either side of the truck. In alternative arrangements, the mounts are extendible mounts permitting lowering the tray onto ground to either side of the truck.

The above described dump trucks are particularly useful for handling of loads in open spaces; however, in constrained spaces (such as closed mines) these particular type of dump trucks are not suitable due to their relative high height.

In fact, the tray in the rear pivoting dump truck requires relative high walls to provided voluminous space for containment of the relatively large loads. Similarly, side pivoting dump trucks also require relative high walls for the same reasons as above, and in addition, the upstanding mounts are of a height higher than the tray.

Furthermore, theses pivoting dump trucks require mechanisms, typically driven by hydraulic system, for pivoting of the trays. These mechanisms are relative expensive and require regular maintenance due to, for example, having a relatively large number of moving parts and the particular environment (corrosive and dusty) in which the dump trucks have to operate.

It is against this background that the present invention has been developed.

SUMMARY OF INVENTION

According to a first aspect of the invention there is provided a tray having side walls and end walls defining an inner space within the tray for receiving a load, the tray being adapted for attachment to a platform of a load carrying vehicle having hook members pivotally attached to the sides of the platform, the tray comprising a plurality of pin members on each of the side wall of the trays, the pins are adapted to receive the hook members for releasably attaching the tray to the platform.

Preferably, the tray is adapted for releasable attachment to a platform of a load carrying vehicle having pivotable hooks, the tray having side and end walls having upper ends defining an open upper end for receiving a load for storage in the tray, the open end comprising front and rear corners, wherein the front and rear corners are adapted to receive jaws of a lifting mechanism for lifting the tray from the platform and tilting the tray.

Preferably, the tray further comprises a plurality of pin members on each of the side wall of the trays, wherein the pin members are adapted to receive the pivotable hooks for releasably attaching the tray to the platform.

Preferably, the front and rear corners of the open end of the tray comprise beam extensions to receive the jaws of the lifting mechanism such that the beam extensions are sandwiched between the jaws and particular arc sections of frames of a rotator.

According to a second aspect of the invention there is provided a load carrying vehicle comprising a body having a platform defining an upper surface and a wheel arrangement attached to lower section of the platform, a tray according to the first aspect of the invention releasably attached to the upper surface of the platform.

Preferably, the body comprises a transporter.

Preferably, the transporter comprises a chassis for provision of the platform for removably receiving the tray.

Preferably, actuation of the hook members occurs either from a cabin of the transporter via an operator or the transporter may be computer controlled self-driving transporter, the hook members being computer-controlled.

Preferably, the transporter comprise a platform having a relative wide extended upper surface permitting receiving a tray having a relatively large surface area.

Preferably, the tray and platform are configured such that the tray is an integral part of the transporter.

Preferably, the upper surface of the platform of the transporter is located at a relative low height with respect to the ground surface.

Preferably, the tray has a relatively large surface area and relative low side walls.

Preferably, the load carrying vehicle further comprising at least one electric motor, a pantograph and trolley boxes mounted on each transporter, the pantograph being adapted to contact overhead electric lines for receiving the electric energy and deliver the electric energy to the trolley boxes for delivery to the electric motor for driving of the load carrying vehicle.

According to a third aspect of the invention there is provided an unloading apparatus for unloading a load contained in a tray of a load carrying vehicle having a transporter adapted to releasably receive the tray, the unloading apparatus comprising a rotator having a support surface for parking of the load carrying vehicle according to the second aspect of the invention, and a plurality of frames arranged in a spaced apart relationship with respect to each other along the support surface, the frames being adapted to secure the tray to the rotator and lifting the tray from the transporter, and means for rotating the rotator about the longitudinal axis of the tray for unloading of the load.

Preferably, the unloading apparatus further comprises a clamp lifting system for lifting the tray and securing the tray to the rotator, wherein the clamp lifting system comprises a plurality of clamp lifting mechanisms, each mechanism being adapted to secure one of the corners of the tray to a section of a frame.

Preferably, the tray comprises a tray as defined according to the first aspect of the invention.

Preferably, the corners of the tray are secured to upper arc sections of the frames.

Preferably, the upper arc sections comprise extensions extending radially from the inner periphery of the upper arc sections.

Preferably, each clamp lifting mechanism comprises a jaw rotatably attached to the frame of the rotator.

Preferably, the clamp lifting mechanisms are attached at a location such that when the clamp lifting mechanisms are moved in unison from the open condition to the closed condition, the jaws of the clamp lifting mechanisms moves towards the upper arc section of the frame in order to lift the tray from the transporter.

Preferably, the extensions extending radially from the inner periphery of the upper arc sections comprise indentations which are adapted to receive portions of the corners of the tray.

Preferably, the rotator comprises an entry and an exit for receiving and permitting exit of either the load carrying vehicle or the transporter.

According to the fourth aspect of the invention there is provided an unloading assembly having a plurality of unloading apparatus according to the third aspect of the invention arranged in a tandem relationship with a road section located between neighbouring rotators.

Preferably, the support surface is adapted for receiving either the load carrying vehicle or the transporter to permit removal or mounting of the tray with respect to the transporter.

According to the fifth aspect of the invention there is provided a system for handling materials located at a loading location to be moved to an unloading location, the system comprising an unloading assembly in accordance with the fourth of the invention and at least one load carrying vehicle according to the second aspect of the invention.

Preferably, the system further comprises a material handling unit.

Preferably, the material handling unit comprises at least one chute wherein each chute is adapted to receive material contained in one tray for moving the material to a processing station.

Preferably, the processing station comprises a rock crusher station.

Preferably, the transporter is an autonomous vehicle.

Preferably, the system further comprises a trolley system comprising a catenary system having overhead electric lines supported on masts arranged in a spaced apart relationship with respect to each other, traction substations, a trolley mast-mounted high voltage supply, and a pantograph and trolley box mounted on each transporter.

Preferably, the trolley boxes are mounted on each transporter for receiving the electric energy collected by the pantographs that are contacting the overhead electric lines and deliver the electric energy to at least one electric motor of each transporter via its trolley box.

Preferably, the trolley system extends to at least one road section of the circuit extending between the loading and unloading stations.

Preferably, the road section comprises an uphill road section.

According to the sixth aspect of the invention there is provided a method for handling of load, for moving the load using a load carrying vehicle according to the second aspect of the invention from a first location to a second location, the method comprises the steps:
 a. loading, at the first location, the load onto a first tray while mounted on the platform of the transporter;
 b. moving the transporter comprising the tray mounted thereon to the second location comprising at least one unloading apparatus according to the third aspect of the invention; and
 c. removing the tray from the platform of the transporter and unloading the tray via the rotator.

Preferably, method further comprises the steps of mounting a second tray onto the transporter with the intention of loading the second tray with load at the first location or another location for delivery to the second location or another third location.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

It should be noted that the figures are schematic only and the location and disposition of the components can vary according to the particular arrangements of the embodiments of the present invention as well as of the particular applications of the present invention.

DESCRIPTION OF EMBODIMENT(S)

Figure 1:
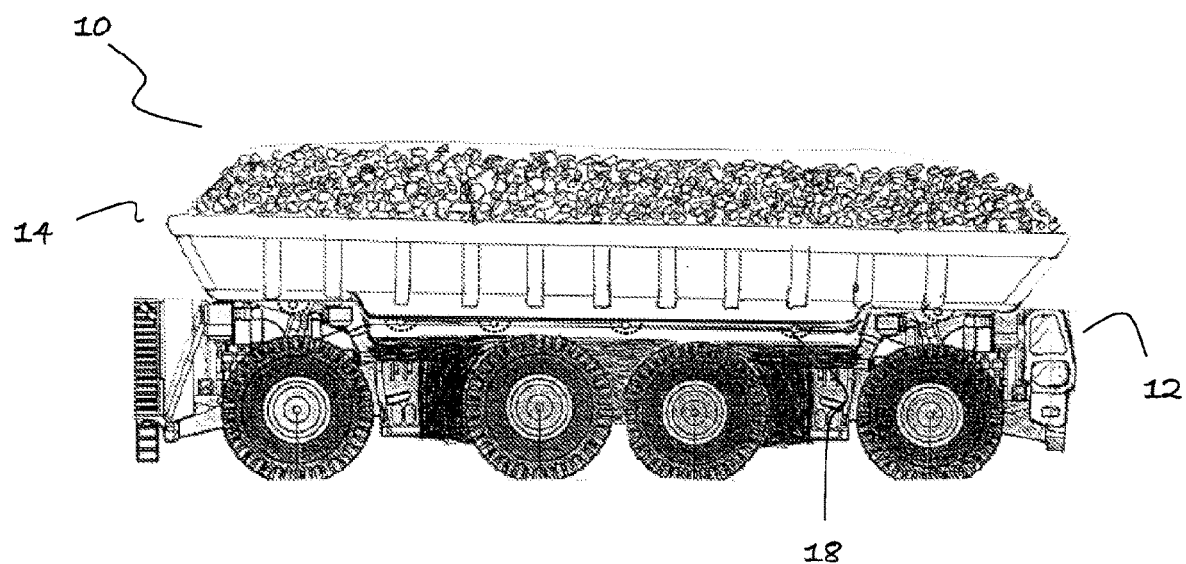
FIG. 1 is a side view of a particular arrangement of a load carrying vehicle in accordance with a first embodiment of the invention carrying a load in its tray.

FIG. 1 shows a particular arrangement of a load carrying vehicle 10 in accordance with an embodiment of the invention carrying a load in its tray 14.

Figure 2:
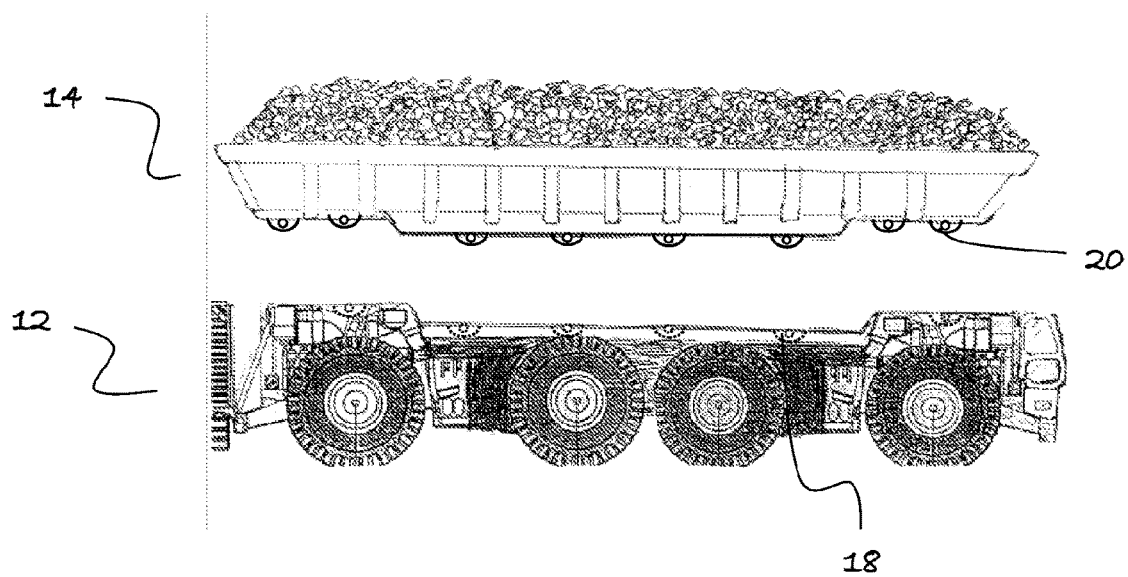
FIG. 2 is a side view of the load carrying vehicle of FIG. 1 with the tray being removed from the body of the load carrying vehicle for illustration purposes.

As shown in FIG. 1, the load carrying vehicle 10 comprises a transporter 12 and a tray 14. In accordance with the present embodiment of the invention, the tray 14 is releasably attached to the transporter 12 permitting removal of the tray 14 for, for example, unload of the load as illustrated in FIG. 2.

Figure 3:
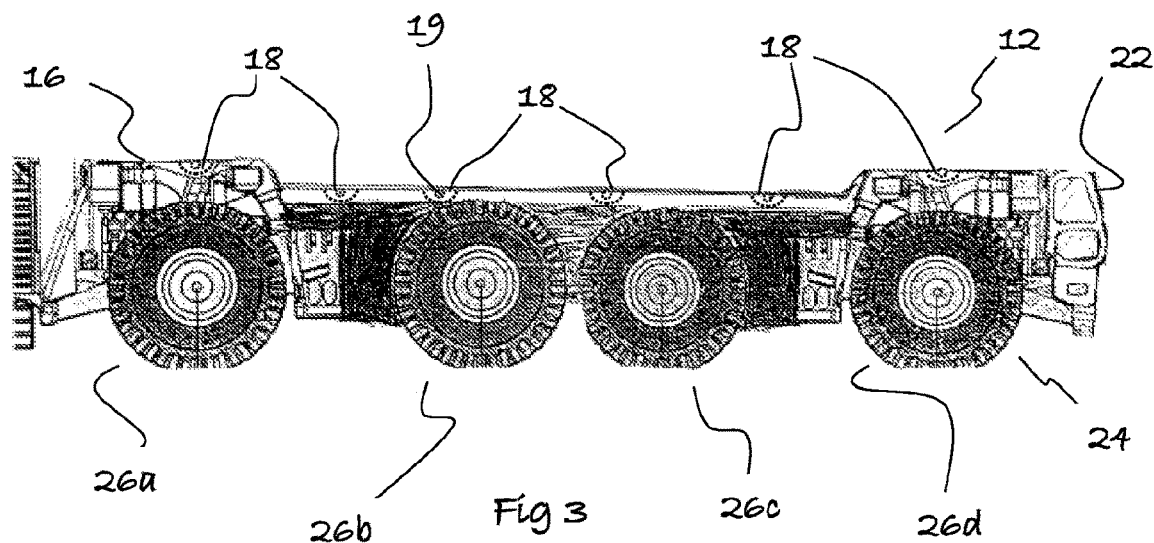
FIG. 3 is a side view of the body of the load carrying vehicle of FIG. 1 with the tray removed.

As shown in FIG. 3, the transporter 12 comprises a chassis for provision of a platform 16 for removably receiving the tray 14. Suitable attachment means 18 are incorporated in the platform 16 for receiving the tray 14. The attachment means 18 are adapted to removable receive counterpart attachment means 20 extending from a lower surface of the tray 14. The attachment means 18 and 20 are adapted to lock and unlock with respect to each other for either securing the tray to the transporter 12 or removal of the tray 14. Operation of the attachment means 18 and 20 may be done from a cabin 22 of the transporter 12; alternatively, the transporter 12 may be computer controlled self-driving transporter permitting operation of the attachment means 18 and 20 by the computer.

In the particular arrangement shown in the figures, the attachment means 18 of the transporter 12 comprises an indentation for receiving the counterpart attachment means 20 of the tray 14. In particular; as shown in, for example, FIG. 3 the transporter 12 comprise a plurality of pockets 18 arranged in a spaced apart relationship with respect to each other in a specific arrangement. The pockets 18 are configured for receiving the counterpart attachment means 20 and comprise means for fixing the counterpart attachment means 20 in the pocket 18. For example, each attachment means 18 may comprise a lockbolt 19 adapted to be selectively displaced between an unlocked and a locked condition. In the unlocked condition, the lockbolt 19 is retrieved from the pocket 18 for receiving the counterpart attachment means 20 (to be described below) of the tray; in the locked condition, the lockbolt 19 is traversing the pocket 18 so as to secure the counterpart attachment means 20 within the pocket 18. Fixing of the tray 14 to the platform 16 of the transporter 12 occurs when the tray 14 is mounted on the platform 16 in order for counterpart attachment means 20 be received by the pockets 18.

Figure 4:
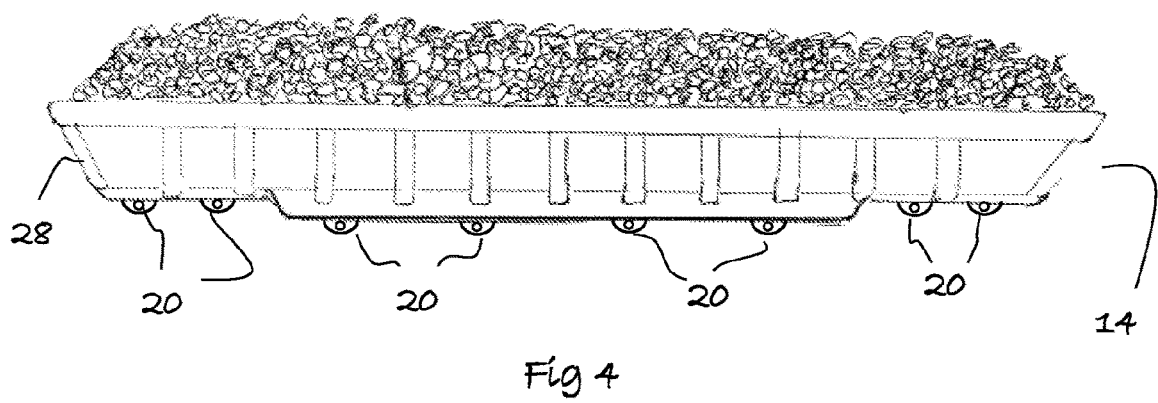
FIG. 4 is a side view of the tray of the load carrying vehicle shown in FIG. 1 removed from the body.
Figure 5:
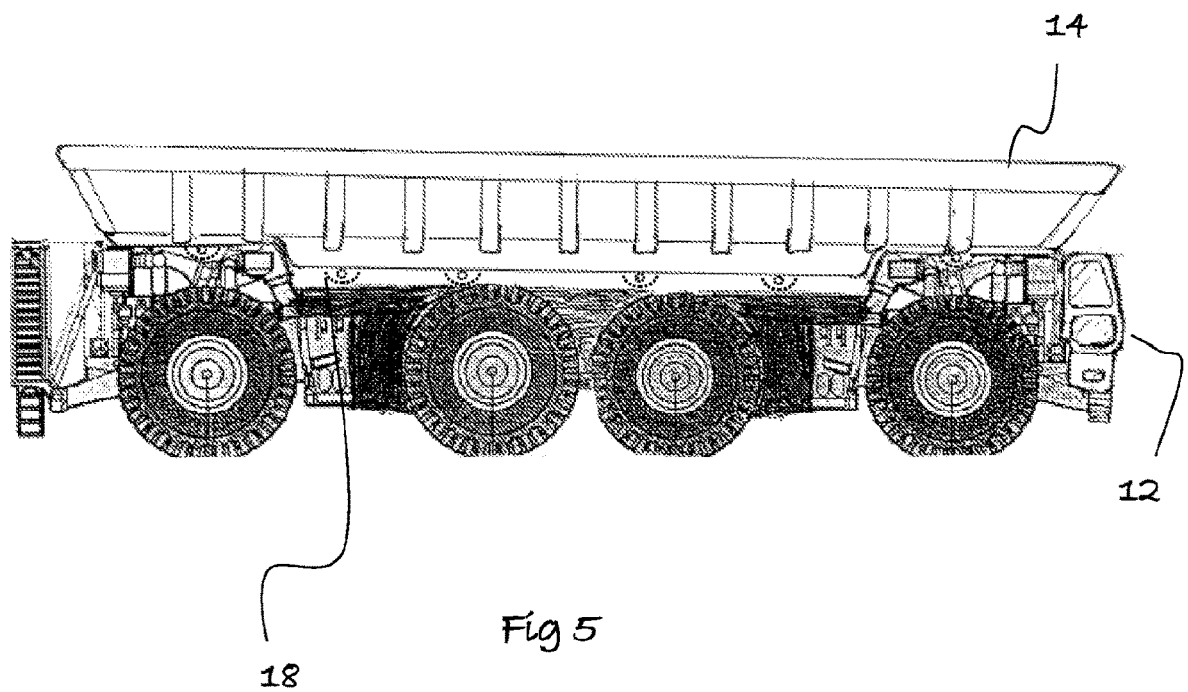
FIG. 5 is a side view of the load carrying vehicle of FIG. 1 prior loading of a load.

Referring now to FIG. 4, as shown in FIG. 4, the tray 14 comprises a plurality of extensions 20 extending from a lower surface of the tray 14. The extensions 20 comprise an opening for receiving the lockbolt 19 of the attachments means 18. In this manner the extensions 20 acts as the strikes to be traversed by the lockbolt 19.

For securing the tray 14, there are equal quantity of extensions 20 than quantity of pockets 18 indenting the platform 16. And, the extension 20 are arranged in a spaced apart relationship with respect to each other in the same specific arrangement than the pockets 18 so as to permit all extensions 20 to be received by the pockets 18.

Selectively fastening and unfastening of the tray 14 to the platform occurs by operation of the locking mechanism for selectively moving the lockbolt 19 between the locked and unlocked condition.

Further, as mentioned before, the extension 20 are arranged in a spaced apart relationship with respect to each other in the same specific arrangement then the pockets 18 so as to permit all extensions 20 to be received by the pockets 18.

In a particular arrangement, the specific arrangement in which the pockets 19 and extensions 20 are placed over, respectively, the upper surface of the transporter 12 and the lower surface of the tray 14 is configured such that the tray 14 is an integral part of the transporter 12. The fact that the tray 14 is an integral part of the transporter 12 is particularly useful because it reinforces the platform of the transporter 12.

Moreover, the transporter 12 comprises a wheel arrangement 24 attached to the transporter 12. In the particular arrangement shown in the figures, the wheel arrangement 24 comprises four-axle lines 26 spaced apart with respect to each other. Each axle-line comprising a multitude of wheels arranged in pairs. In other arrangements, the transporter 12 may comprise more than four-axle lines 26. It is particularly advantageous the use of a transporter 12 because it allows provision of a platform 16 with a relative wide extended upper surface permitting receiving a tray 14 having a relatively large surface area. As will be explained below, the provision of this relative wide extended upper surface permits defining a load carrying vehicle of a relative low height.

As shown in, for example, FIG. 3, the top surface of the platform 16 of the transporter 12 is located at a relative low height with respect to the ground surface.

The fact that the platform 16 travel height is relatively low is particularly advantageous because it permits provision of a load carrying vehicle 10 of a relative low height and allowing deployment of the load carrying vehicle 10 into confined spaces such as mine shafts.

What is mentioned in the above paragraph, is particularly true because the relative large extension of the upper surface of the platform 16 permits receiving a tray 14 having a relative large surface area allowing to reduce the height of the side walls 28 of the tray 12—see FIG. 4. By reducing the height of the tray 14, the overall height of the load carrying vehicle 10 will be reduced when compared to conventional dump pivoting trucks described in the Background Art.

The particular arrangement of transporter 12 is particularly useful for handling loads (such as sand, gravel, ores or demolition waste) because, in accordance with the present embodiment of the invention, the transporter 12 is adapted to be removably receive the tray 14. Thus, the tray 14 may be selectively displaced between a position mounted on the platform 16 of the transporter 12 (for loading of the tray) and another position removed from the platform 16 for unloading of the tray 14.

Figure 6:
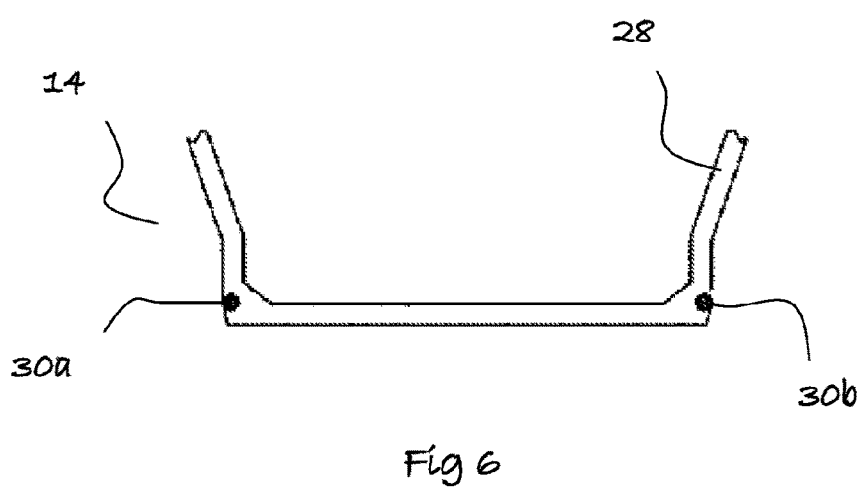
FIG. 6 is an end view of the tray of FIG. 1 prior loading of a load.
Figure 7:
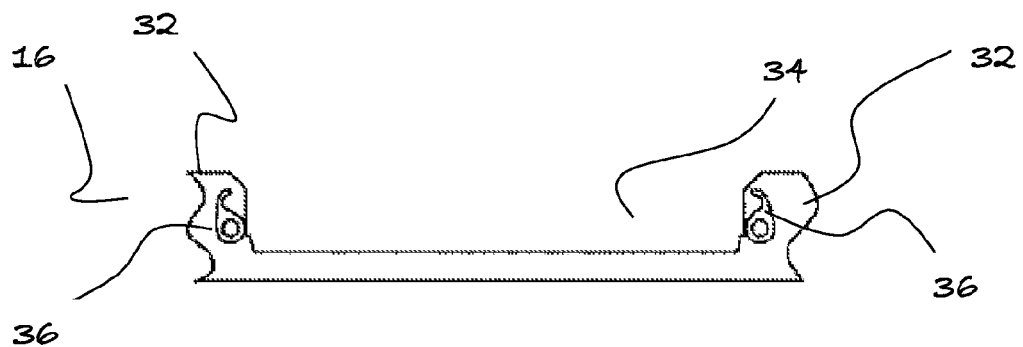
FIG. 7 is an end view of the platform of the load carrying vehicle of FIG. 3.
Figure 8:
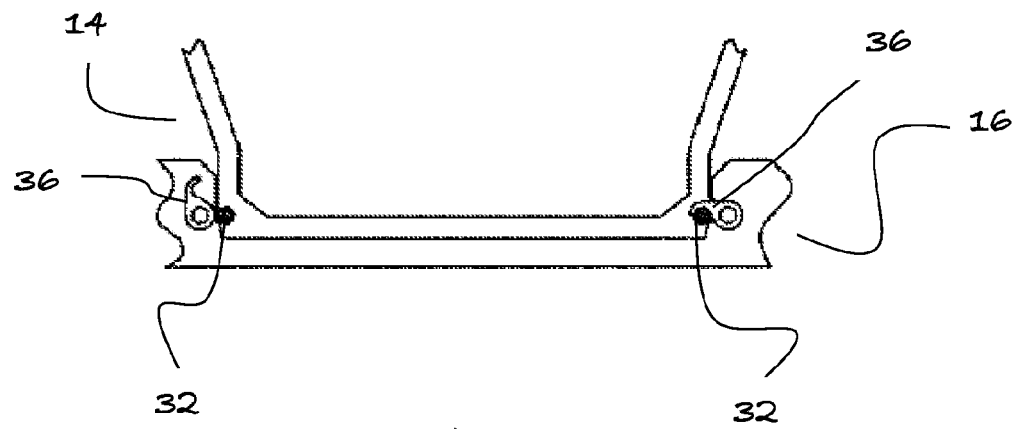
FIG. 8 is an end view of the platform of the load carrying vehicle of FIG. 5.

Referring now to FIGS. 6 to 8, FIGS. 6 to 8 show an alternative arrangement of attachment means for releasably attaching the tray 14 to the platform 16 of the tray 14.

As shown in FIG. 6, the tray 14 comprises attachment means 30a and 30b at each end of the tray 14. The attachments 30 comprise pins 32 at the lower corners of the tray 14. The pins 30 extend away from the end surface of the ends of the tray 14; as will be described below the outward extending pins 30 are adapted to receive hooks 34 (see FIG. 7) for attachment of the tray 14 to the platform 16.

FIG. 7 shows an end view of the platform 16; as shown in FIG. 7, the platform 16 comprises side walls 32 to define an indentation 34 for receiving the tray 14 as shown in FIG. 8.

Further, the platform 16 comprises hooks 36 at each of its ends. As shown in FIG. 7, the hooks 36 are located at particular locations of the ends of the platform 16 such that when the tray 14 is inserted in the indentation 34 of the platform 16, the hooks 36 when in the locked condition engage the pins 32 of the tray 14 fastening the tray 14 to the platform.

The hooks 36 are rotatably attached to the ends of the platform 16 permitting rotation of the hooks 36 for engagement with the pins 32. This particular arrangement permits selectively rotating the hooks 36 between an unlocked condition (see FIG. 7) and a locked condition (see right hook 36 in FIG. 8) for, respectively, unlocking the tray 14 for removal thereof and locking the tray 14 in position for fastening thereof to the platform 16.

The particular configuration of platform 16 and tray 14 as depicted in FIGS. 6 to 8, is particularly advantageous because in this particular configuration the tray 14 is an integral part of the transporter; this reinforces the platform 16 increasing the strength of the transporter 12 permitting carrying relatively large loads.

In a particular arrangement of the present embodiment of the invention, there is provided a method for handling of load (such as sand, gravel, ores or demolition waste); such as for moving the load from a first location to a second location.

In particular, the method comprises the steps:
a. loading, at the first location, the load onto a first tray while mounted on the platform 16 of the tray 14;
b. moving the transporter comprising the tray 14 mounted thereon to the second location;
c. removing the tray 14 from the platform 16 of the transporter 12; and
d. unloading the tray 14.

The method further comprises the steps of mounting a second tray onto the transporter 12 with the intention of loading the second tray with load from the first location or another location for delivery to the second location or another third location.

In a particular arrangement, unloading of the tray 14 may occur via pivoting of the tray 14; for example, at an unloading location (such as the second location) there may be provided an array of extendable mounts adapted to raise the tray 14 from the platform 16 of the transporter 12 after the transporter 12 (with the loaded tray 14) has driven through the array of mounts such that the upper ends of the mounts engage particular locations of the tray 14 permitting raising of the tray 14 via extending the mounts, and removal of the transporter 12 for mounting of another tray 14 onto the platform 16.

The mounts are adapted to pivot the loaded tray 14 for unloading of the tray 14.

For securing the tray 14 to the mounts, there are provided a plurality of attachments means for pivotally attaching the tray 14 to the upper end of the mounts. In a particular arrangement, each attachment means comprise a locking mechanism comprising a lock bolt arrangement and a strike arrangement to be traversed by the lockbolt. For example, the lock bolt arrangements may be attached to the tray 14 and the strike arrangements may be attached to the upper end of the mount. Selectively fastening and unfastening of the tray 14 to the mount occurs by operation of the locking mechanism for selectively moving the lockbolt between the locked and unlocked condition. The lockbolt arrangement and strike arrangement are configured for permitting pivotal movement of the tray 14 with respect to the mount.

In alternative arrangements the tray 14 is capable to be removed from the transporter by lowering the floor on which the transporter 12 rests when the combined unit (tray 14 and transporter 12) is in a position ready to remove the tray 14. In this particular arrangement, the floor comprises a moveable platform capable of being raised and lowered. In the lowered condition the tray 14 could be removed without the need of applying a force to remove the tray 14 (the force of gravity permits lowering the moveable platform).

In particular, when the transporter 12 is on the moveable platform, the tray 14 is pivotally attached to fastening means such that when the moveable platform is lowered, the tray 14 is removed from the transporter 12 with the tray 14 being spaced apart from the transporter 12. At this stage, the transporter 12 may be removed and the tray 14 may be unloaded, for example, as described with reference to the array of extendable mounts described earlier. Once the tray 14 is unloaded, a transporter 12 may be located onto the moveable platform for lifting of the transport 12 (by raising the moveable platform) for receiving the tray 14 and securing the tray as described above.

FIGS. 9 to 23 show a load carrying vehicle 10 including a transporter 12 and a tray 14 according to a second embodiment of the invention parked within an unloading apparatus 40 located at an unloading location 38 (the second location) according to a second embodiment of the invention. The load carrying vehicle 10 including the transporter 12 and tray 14 according to the second embodiment serves similar purposes than the load carrying vehicle 10 and tray 14 of the first embodiment and similar reference numerals are used to identify similar parts.

The unloading location 38 according to the second embodiment of the invention comprises the unloading apparatus 40 being adapted for receiving the load carrying vehicle 10 including the transporter 12 and the tray 14. In particular, the unloading apparatus 40 comprises a system for receiving the load carrying vehicle 10, removing the tray 14 from the transporter and tiling of the tray 14 for unloading of the tray 14. The system comprises an area for parking the load carrying vehicle 10, a lifting assembly for releasably attaching the tray 14 and lifting of the tray 14 to permit removal of the transporter 12 from below of the tray 14, and a tilting assembly for tilting of the tray for unloading thereof.

In the particular arrangement shown in the figures, the unloading apparatus comprises a rotator 40 that is adapted to receive the load carrying vehicle 10, removing the tray 14 from the transporter 12, and rotating for tiling of the tray 14 with the objective of unloading the tray 14.

Rotation of the rotator 40 permits unloading cargo stored in the tray 14 via tilting of the tray 14 during rotation of the rotator 40.

In particular, as will be described with reference to the method of operation of the rotator 40, the tray 14 is secured to the rotator 40; and then, the tray 14 is raised permitting removing the transporter 12 from below the tray 14. After removal of the transporter 12 from below the tray 14, the tray 14 is unloaded by rotating of the rotator 40 resulting in tilting of tray 14.

After unloading of the tray 14, the rotator 40 is returned to the original condition to locate the tray 14 in the untilted condition. At this stage, the tray 14 may be remounted on a transporter 12 in order to return the load carrying vehicle 10 to the loading location (the first location) for refilling of the tray 14 with load.

Referring to FIGS. 9 to 12, FIGS. 9 to 12 show the load carrying 10 parked within the rotator 40. The figures are schematic drawing showing the rotator 40 as isolated; however, in operation, the rotator 40 comprises an entry 42 and an exit 44 (see FIG. 10). The entry 42 is located at the end of an access road (not shown) permitting the load carrying vehicle 10 to gain access to the rotator 40 when traveling from the loading location via the access road to the unloading location 38. The exit 44 is located at the start of an exit road (not shown) to permit the transporter 12 (with or without the tray 14) to exit the rotator 40 and move to the loading location or any other locations.

In accordance with the second embodiment of the invention, the rotator 40 comprises a support surface 46 and a plurality of frames 48 arranged in a spaced apart relationship along the support surface 46. The support surface 46 acts as a parking bay for the tray 14 to rest while (as will be described with reference to the method of operation of the rotator 40) the tray 14 is released from the transporter 12.

Figure 17:
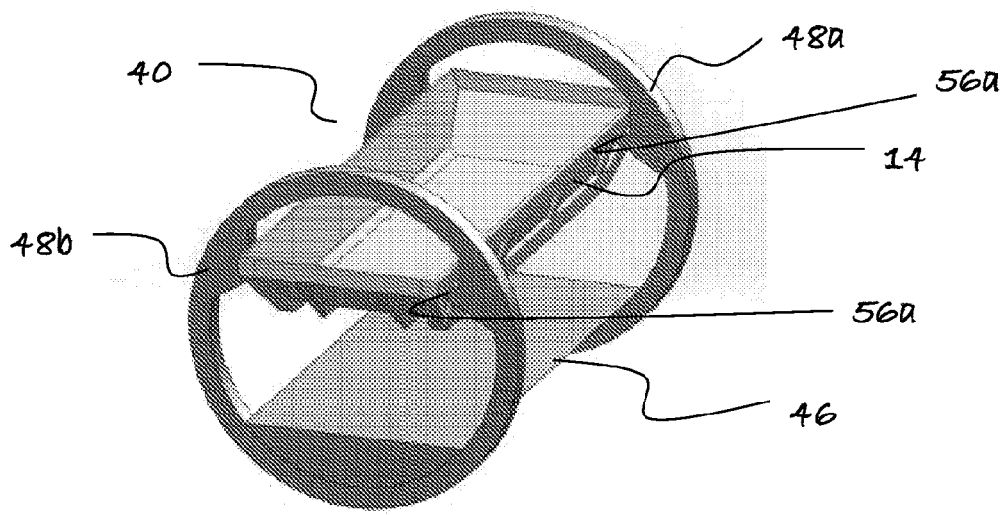
FIG. 17 is a top perspective view of the tray with the transporter removed from below the tray prior tilting of the tray.
Figure 18:
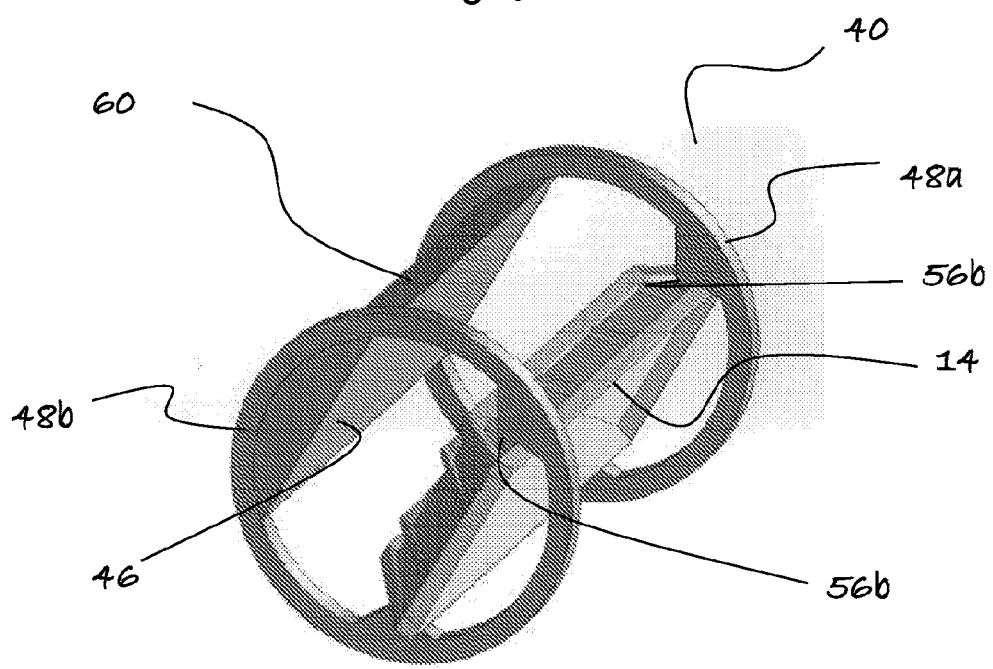
FIG. 18 is a top perspective view of the tray with the transporter removed from below the tray after unloading of the tray.

The frames 48 are adapted for securing the tray 14 to the rotator and subsequently lifting the tray 14 from the transporter 12 to permit the transporter 12 to exit the rotator 40 leaving the tray 14 attached to the frames 48 as shown in, for example, FIG. 17.

Further, in a particular arrangement the frames 48 are adapted to be operatively connected to driving means for rotation of the rotator 40 with the objective of tilting of the tray 14 as was described before.

Figure 9:
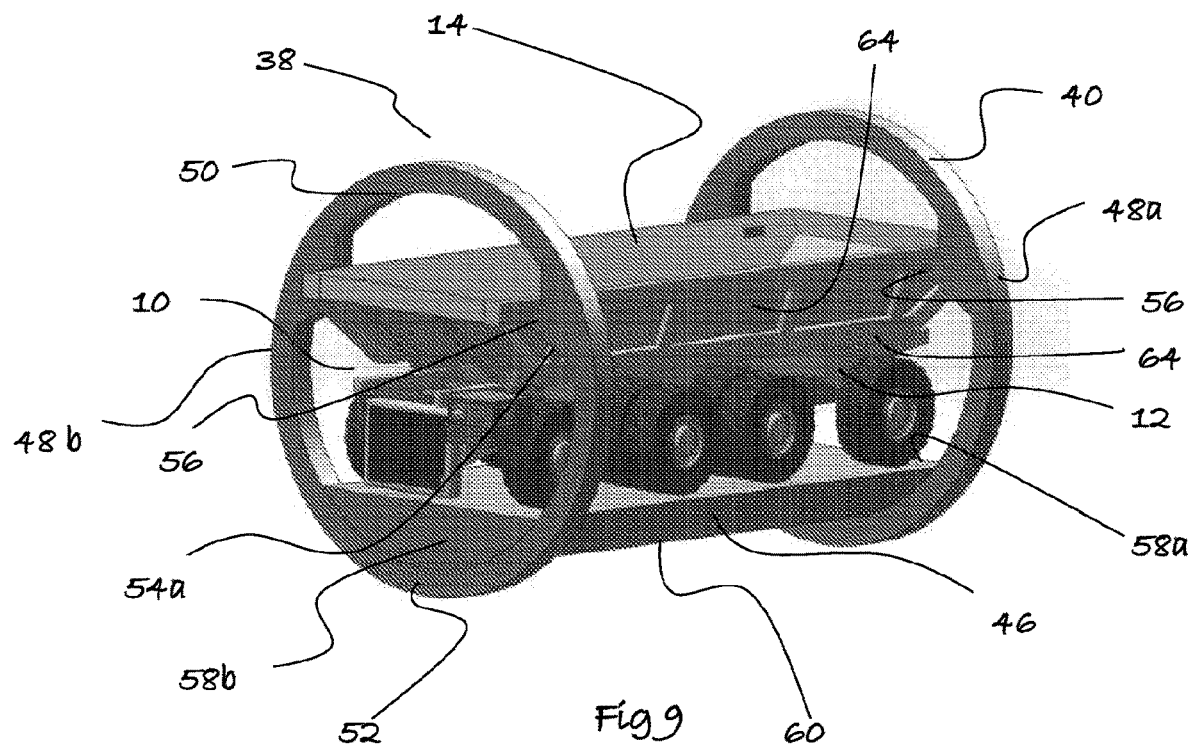
FIGS. 9 to 11 are respectively perspective, side and front views of a particular arrangement of a load carrying vehicle including a transporter and a tray in accordance with a second embodiment of the invention and located within a particular arrangement of an unloading rotator in accordance with the second embodiment of the invention at the unloading location prior raising of the tray of the load carrying vehicle.
Figure 10:
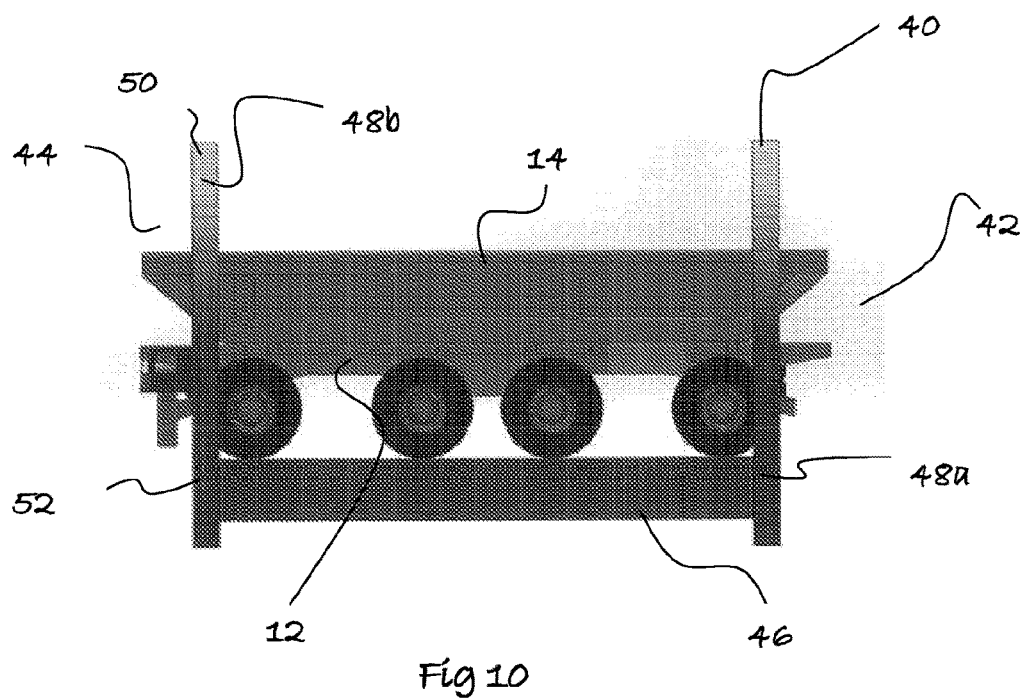
Figure 11:
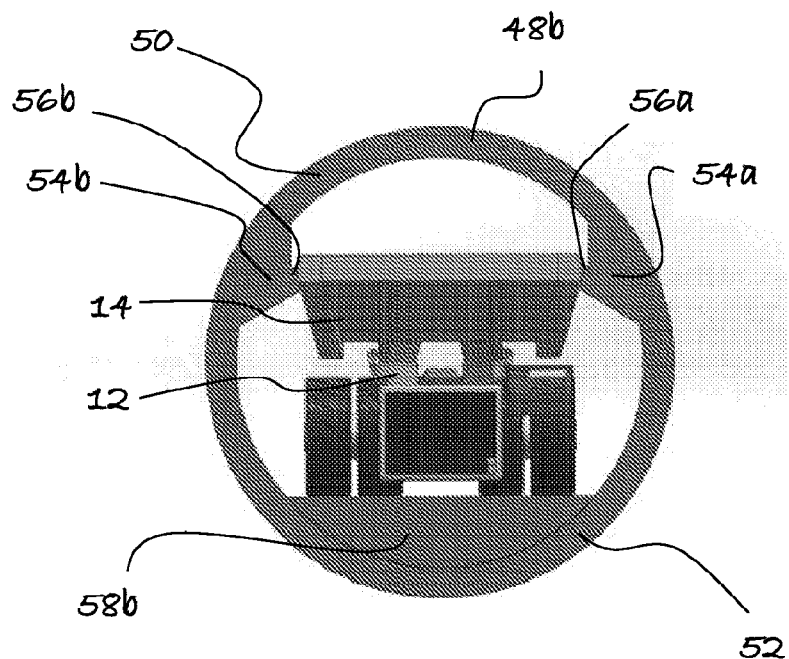

As shown in FIG. 9, the particular arrangement of rotator 40 shown in the figures comprises a pair of spaced apart frames 48a and 48b attached to the ends of the support surface 46. In particular, the frames 48a and 48b are of circular configuration having an upper arc section 50 and a lower arc section 52.

Further, each frame 48 at its upper arc comprises means for securing the tray 14 to the rotator 40. The means for securing the tray 14 are located at the upper arc 50 of the frames 48 in this manner, as the load carrying vehicle 10 enters the rotator 40, the means for securing the tray 14 may engage the tray 14 as is shown in FIG. 9.

In the particular arrangement shown in the FIGS. 9 to 23, the means for securing the tray 14 comprises extensions 54a and 54b extending radially from the inner periphery of the upper arc 50. Each extension 54 comprises hands 56 adapted for engaging the side walls 64 of the tray 14 in order to secure the tray 14 so that the tray 14 may tilt during rotation of the rotator 40. Further, the extensions 54 including the hands 56 may also be adapted for lifting of the tray 14 when the tray 14 is engaged to the hands 56.

The following paragraphs describe a particular arrangement of a clamp lifting system in accordance with the present embodiment of the invention for lifting the tray 14 and securing the tray 14 to the rotator 40.

FIGS. 24 to 28 illustrates the clamp lifting system for lifting the tray 14 and securing the tray 14 to the rotator 40 for unloading of the tray 14 as previously described.

Figure 24:
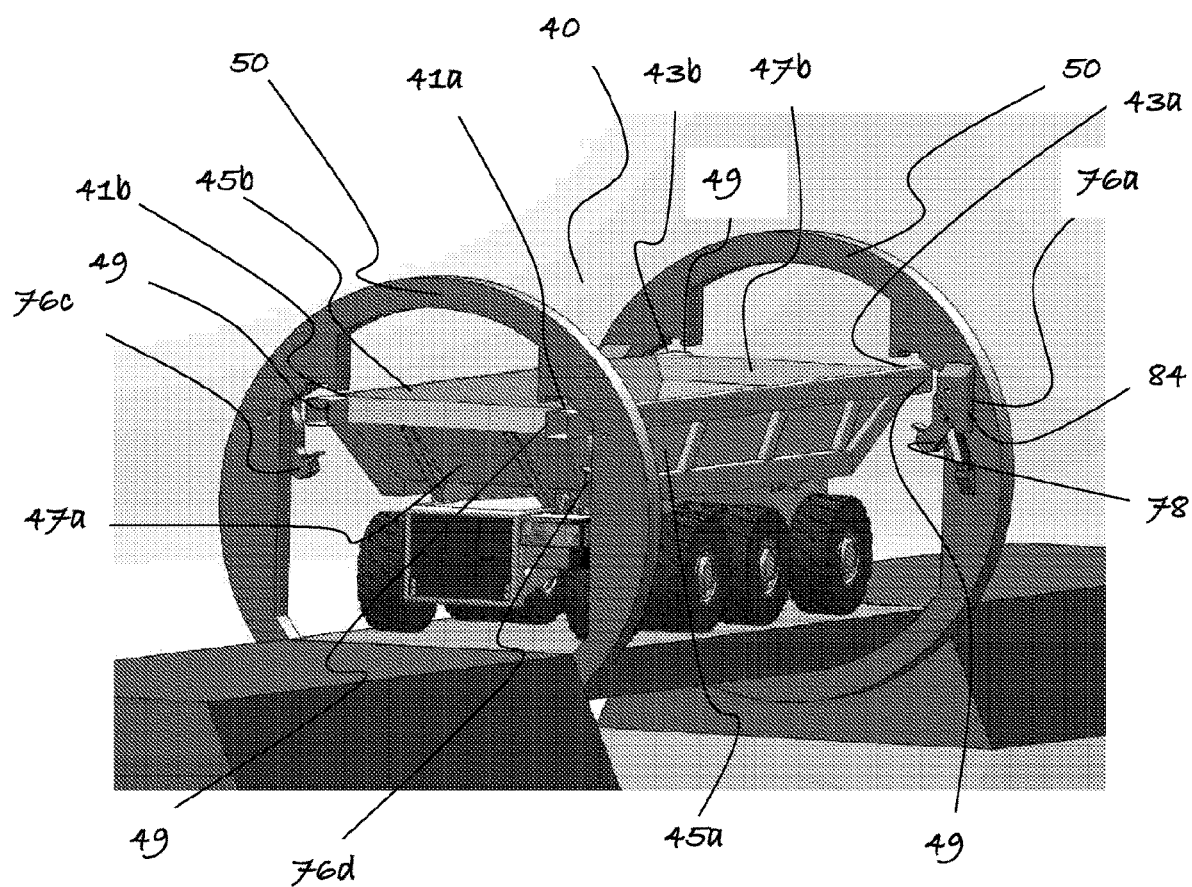
FIG. 24 is a perspective view of the load carrying vehicle shown in FIG. 9 incorporated in another arrangement of the unloading rotator in accordance with the present embodiment of the invention comprising clamp lifting mechanisms.
Figure 25:
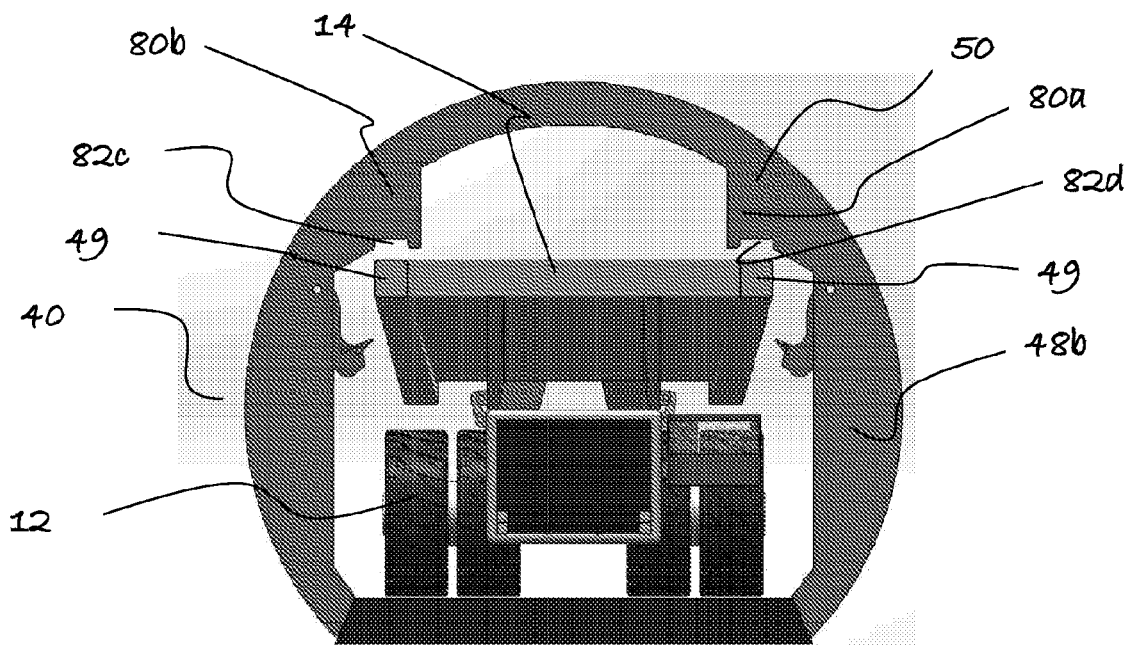
FIGS. 25 and 26 are front views of the load carrying vehicle within the rotator shown in FIG. 24 showing the clamp lifting mechanisms, respectively, in open and closed condition.
Figure 26:
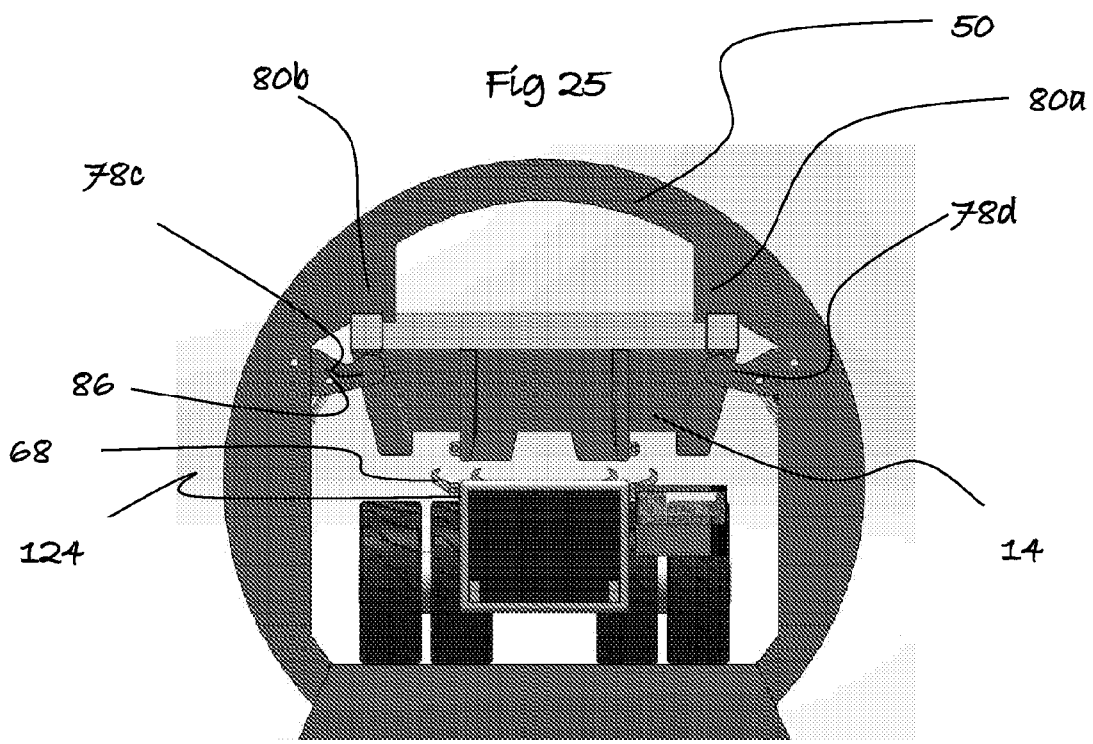
Figure 27:
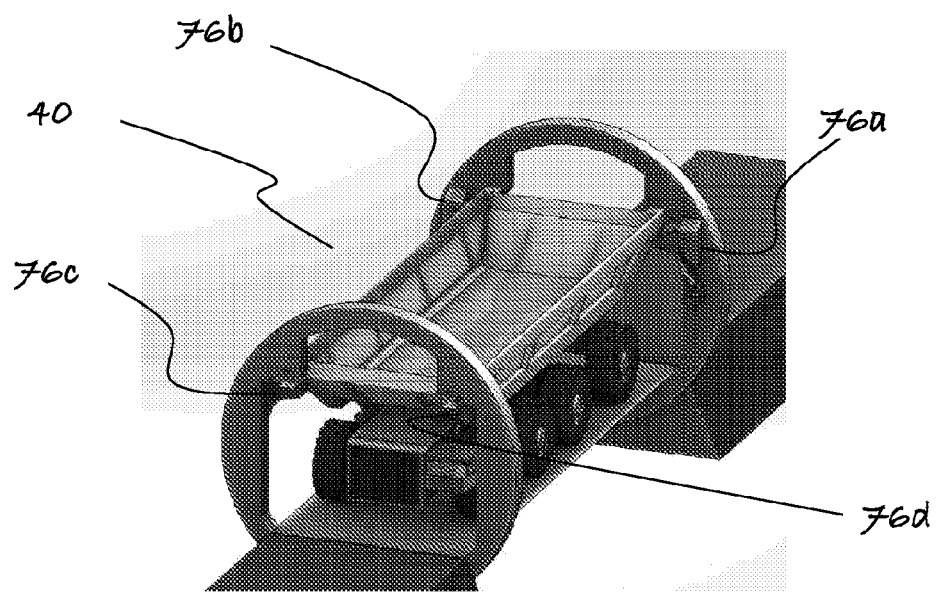
FIG. 27 is a top perspective view of the rotator shown in FIG. 24 with the clamp lifting mechanisms in closed condition incorporating the load carrying vehicle.

Referring to FIGS. 24 to 28, as shown in these figures, the clamp lifting system comprises a plurality of clamp lifting mechanisms 76, each mechanism 76 being adapted to secure one of the corners of the tray 14 to the upper arc sections 50 as is shown in FIG. 26. For this, the upper arc sections 50 comprise extensions 80 extending radially from the inner periphery of the upper arc sections 50.

Referring, for example, to FIG. 24, the particular arrangement of tray 14 to be used in conjunction with the rotator 40 depicted in FIGS. 24 to 31 comprises front corners 41a and 41b and rear corners 43a and 43b defined by upper ends of the side walls 45a and 45b and end walls 47a and 471a. As best shown in FIG. 24, the tray 14 comprises beam extensions 49 adapted to receive jaws 78 such that the beam extensions 49 are sandwiched between the jaws 78 and upper arc section 50 of the frame 48 (see FIG. 26) for securing the tray 14 to the rotator 40 for lifting and tilting of the tray 14.

In particular, as best illustrated in FIG. 24, each clamp lifting mechanism 76 comprises one of the jaws 78 rotatably attached to the frame 48 of the rotator 40.

The clamp lifting mechanisms 76 are attached at a location such that when the clamp lifting mechanisms 76 are moved in unison from the open condition (see FIG. 25) to the closed condition (see FIG. 26), the jaws 78 of the clamp lifting mechanisms 76 moves towards the upper arc section 50 of the frame 48 (defining clamps) in order to lift the tray 14 from the transporter 12 as is depicted in FIG. 26.

As shown in FIG. 26, when the clamp lifting mechanisms 76 are in the closed condition, the corners of the tray 14 are sandwiched between the jaw 78 and the extensions 80. In particular, the extensions 80 comprise indentations 82 as shown in FIG. 25, which are adapted to receive portions of the corners of the tray 14 to impede lateral movement of the tray 14.

As mentioned before, each jaw 78 is rotatably attached to the frame 48 at a location adjacent the arc section 50. As shown in FIG. 24, each clamp mechanism 76 comprises a housing 84 for receiving the pivoting end (opposite to the jaw 78) of the arms 86 of the jaw 78 and attaching the pivoting end within the housing 84 via a pivot joint to permit rotation of the jaw 78.

Further, rotation of the jaws 78 is driven via hydraulic cylinders 88. Each hydraulic cylinder 88 are activated by hydraulic fluid provided to the hydraulic cylinder 88 via piping in fluid communication with a pump system operatively connected to a control unit for operation of the unloading apparatus.

Figure 28:
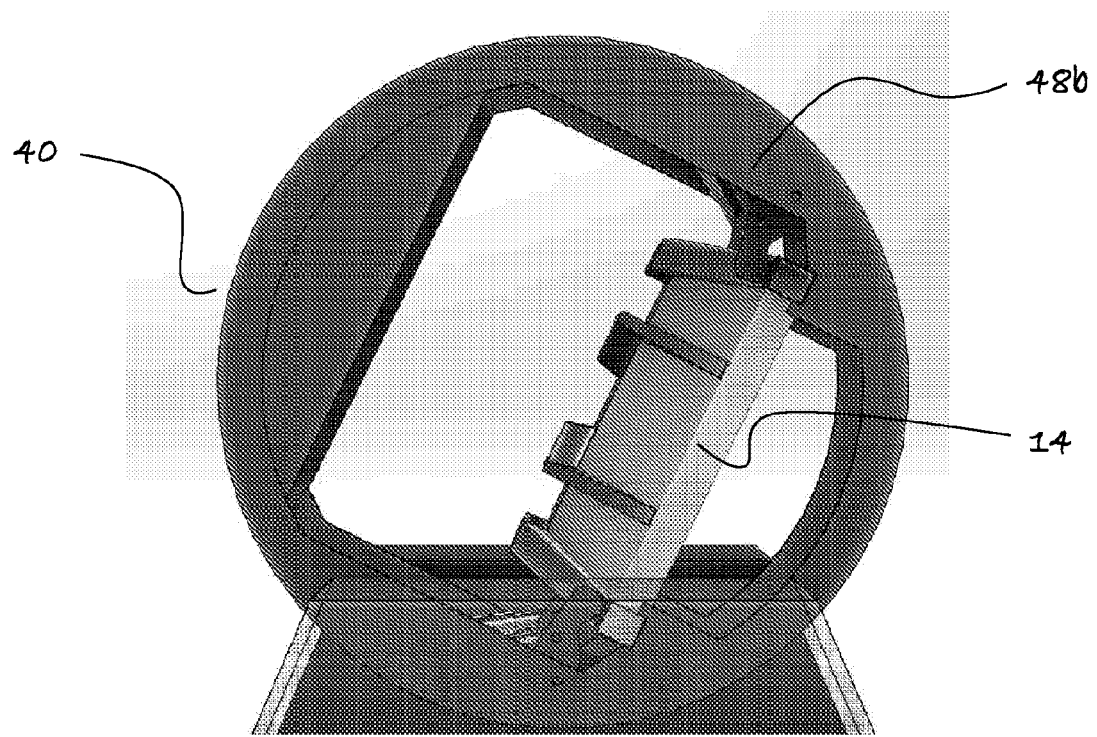
FIG. 28 is a front view of the rotator shown in FIG. 24 incorporating a tray in tilted condition.
Figure 29:
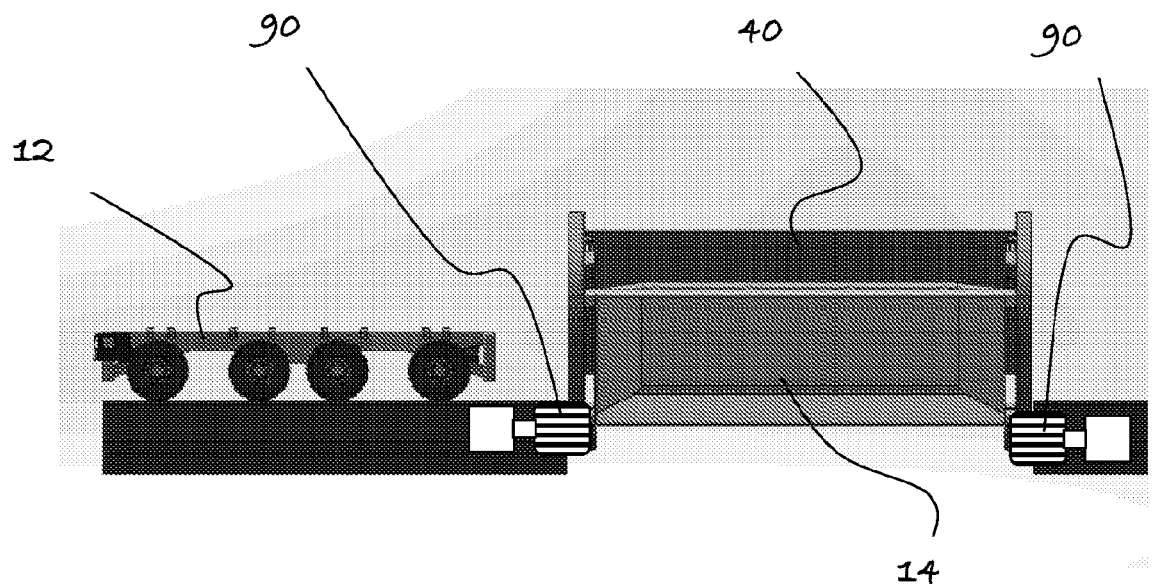
FIG. 29 is a side view of the rotator shown in FIG. 24 incorporating a tray in tilted condition.
Figure 30:
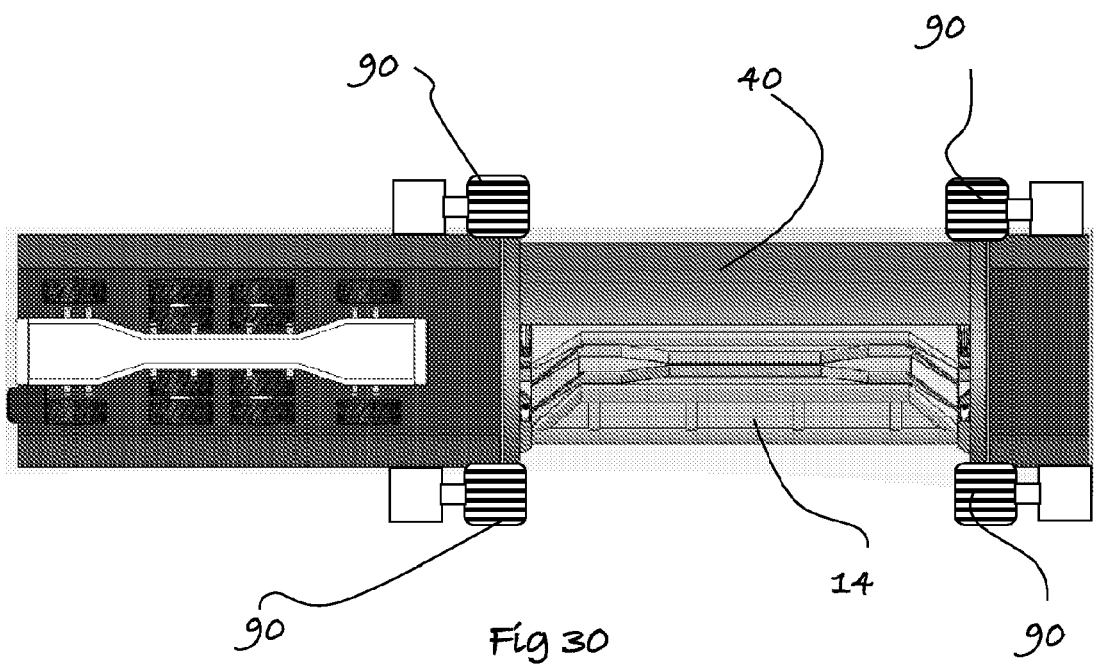
FIG. 30 is a top view of the rotator shown in FIG. 24 incorporating a tray in tilted condition.

Referring now to FIGS. 28 and 29, as mentioned before the rotator 40 rotates in order to tilt the tray 14 for unloading of the load within the tray 14. The tray 14 may be driven via a gear system with the rotator 40 being supported by idle wheels 90.

Furthermore, as mentioned before the rotator 40, comprises a support surface 46 for receiving the load carrying vehicle 10. In the particular arrangement shown in the figures, the support surface 46 extend between the frames 48 having ends 58a and 58b attached to the inner periphery of the lower arc 52. As shown in FIG. 9, the cross section of the support surface 46 is configured as a semi-circle in order to define a curved lower surface 60 permitting abutment and attachment of the lower surface 60 of the ends 58 of the support surface 46 to the inner periphery of the lower arc 52 of the frames 48.

As was described before, the tray 14 may be detached from the transporter 12 to allow (1) removal of the transporter 12 from below the tray 14, and (2) tilting of the tray 14 for unloading of the tray 14; to permit this, the tray 14 is releasably attached to transporter 12.

Figure 12:
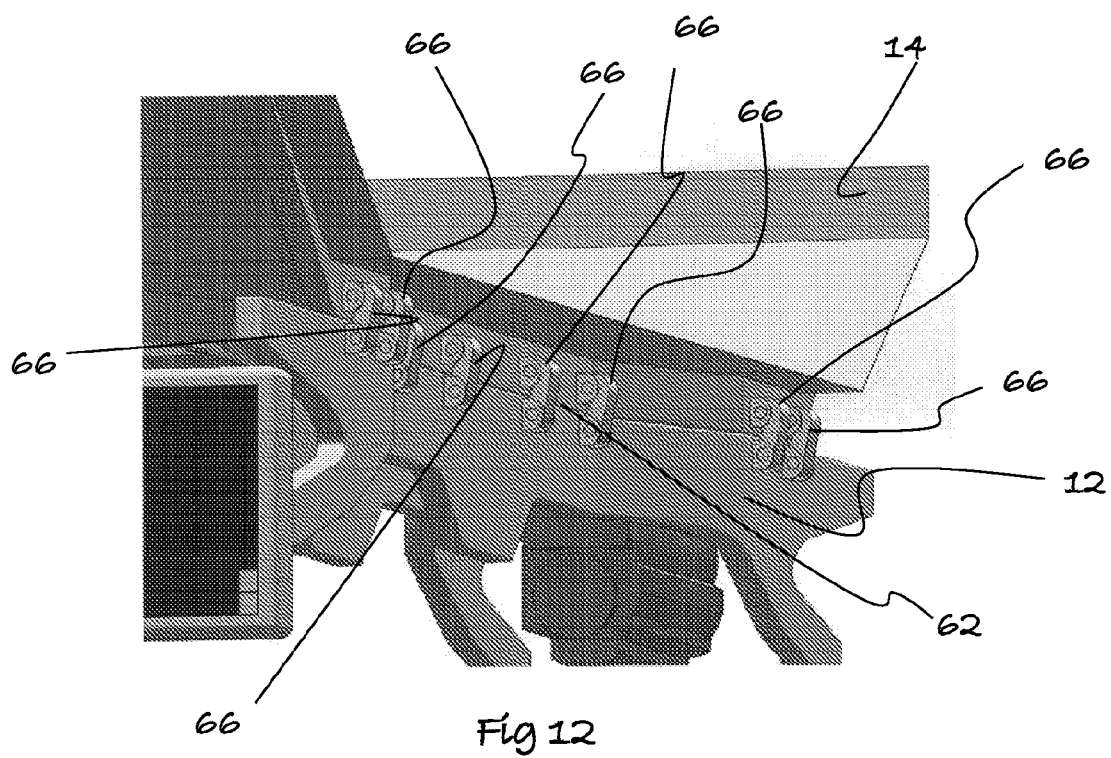
FIG. 12 is a detail of a side view of the load carrying vehicle shown in FIG. 9 depicting the tray of the load carrying vehicle secured to the platform of the load carrying vehicle via attachment means in locked condition.
Figure 13:
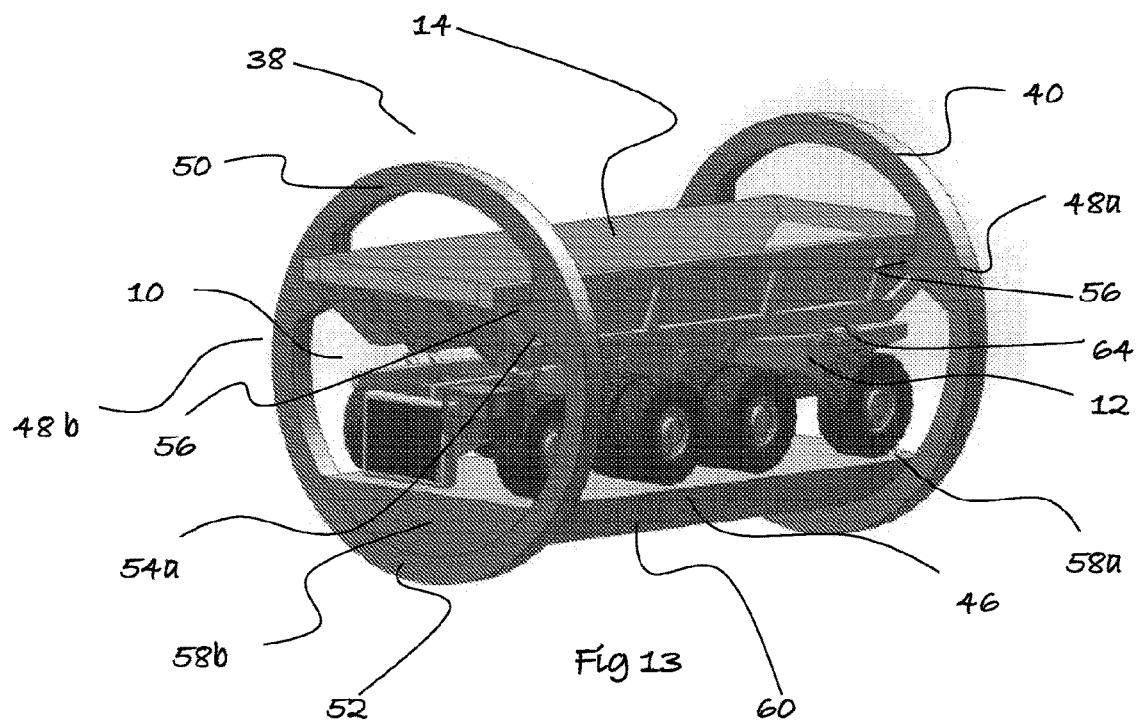
FIGS. 13 to 15 are respectively perspective, side and front views of the load carrying vehicle shown in FIG. 9 at the unloading location after raising of the tray of the load carrying vehicle.
Figure 14:
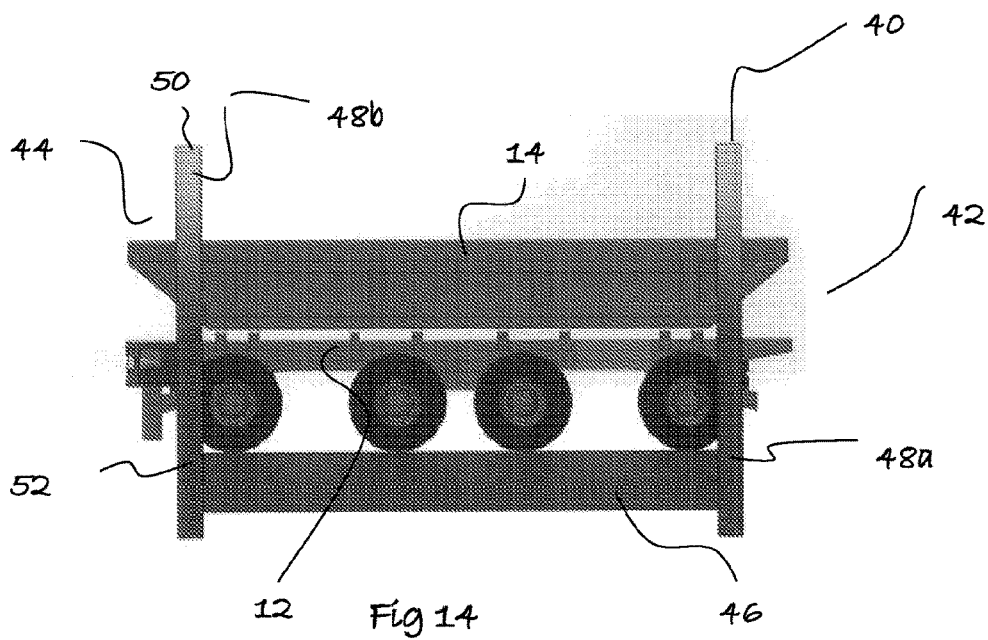
Figure 15:
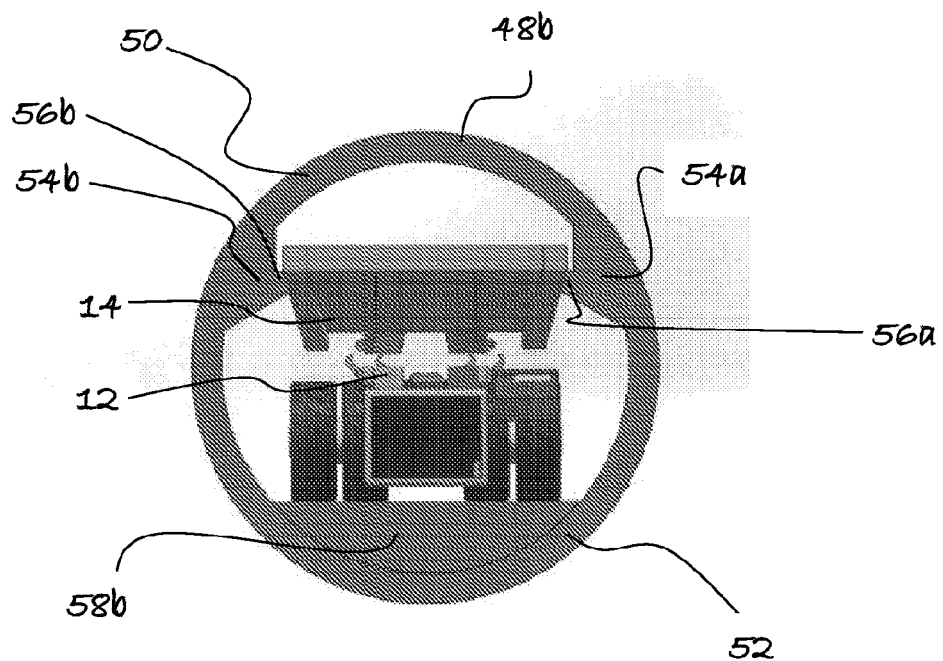
Figure 16:
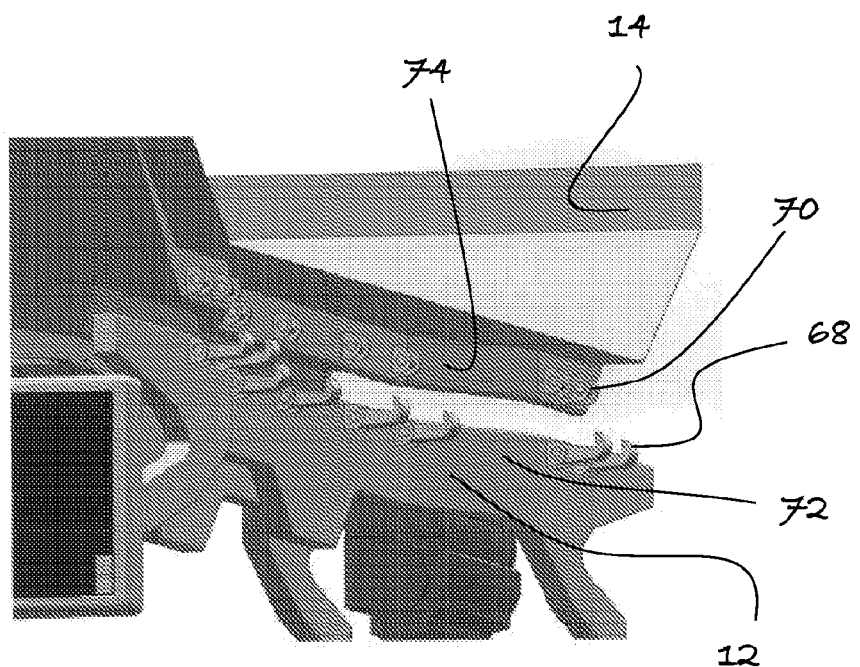
FIG. 16 is a detail of a side view of the load carrying vehicle shown in FIG. 13 depicting the tray of the load carrying vehicle in raised condition with respect to the platform of the load carrying vehicle showing the attachment means in unlocked condition.

Releasable attachment of the tray 14 to the transporter 12 occurs via attachment means 62 illustrated in locked condition in FIG. 12 and in unlocked condition in FIG. 16.

Referring to FIGS. 12 and 16, FIGS. 12 and 16 show, respectively, side views of the load carrying vehicle 10 shown in FIG. 9 depicting the attachment means 62 in locked and in locked condition. For illustration purposes, the side wall 64 of the tray 14 has been removed from the tray 14 permitting visualisation of the attachment means 62.

As shown in FIG. 12, the attachment means 62 comprise a plurality of clamp locks 66 arranged in a spaced apart relationship with respect to each other along the side of the load carrying vehicle 10. In particular, each clamp lock 66 comprises a hook member 68 and a pin member 70 for fastening of the hook member 68 when the clamp lock 66 is in the locked condition—see FIG. 12. The hook members 68 are pivotable hook members 68 due to being pivotally attached to the sides of the transporter 12.

As best seen in FIG. 16, the hook member 68 is attached to the upper edge 72 of the side of the transporter 12, and the pin member 70 is attached to the side of the chassis 74 of the tray 14. In this arrangement, the tray 14 may be attached to the transporter 12 by locking the hook members 68 to the pin members 70, as shown in FIG. 12. Detachment of the tray 14 from the transporter 12 occurs when removing the hook members 68 from the pin members 70, as shown in FIG. 16.

Furthermore, as mentioned before, once the tray 14 has been detached from the transporter 12, the tray 14 is lifted for removing of the transporter 12. Lifting of the tray 14 occurs via the frames 48 and 48 of the rotator 40.

Figure 34:
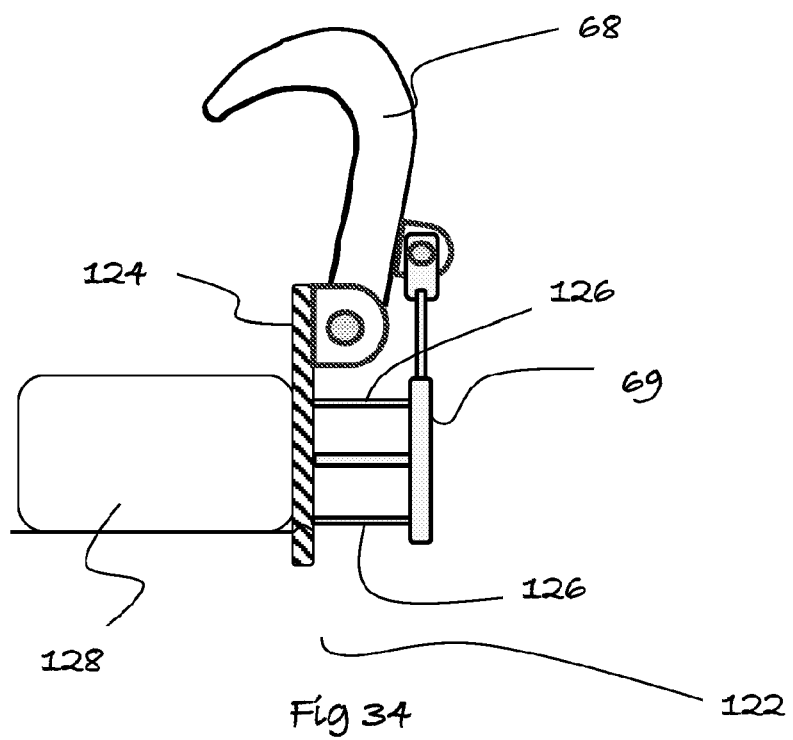
FIG. 34 shows a side view of a hydraulic system attached to the side wall of the transporter for operation of the hook members.

Referring now to FIG. 34, FIG. 34 shows a side view of the hook member 68 and of a hydraulic system 122 attached to the side wall 124 of the transporter 12.

In the particular arrangement, rotation of the hook members 68 is driven via the hydraulic system 121 comprising hydraulic cylinders 69 with each hook member 68 being operatively connected to a hydraulic cylinder such as hydraulic cylinder 69 having one end attached to the side wall 124 of the transporter 12 and the other end to the hook member 69. Each hydraulic cylinder 69 is activated by hydraulic fluid provided to the hydraulic cylinder 69 via piping 126 in fluid communication with a pump system 128 operatively connected to a control unit for operation of hydraulic cylinders 69. Operation of the hydraulic cylinder 69 may be done from a cabin 22 of the transporter 12; alternatively, the transporter 12 may be computer controlled self-driving transporter permitting operation of the hydraulic cylinders 69 by the computer. FIG. 34 shows a particular arrangement of a hydraulic cylinder 69 attached between the hook member 68 and the side wall 124 of the transporter 12.

The particular arrangement shown in FIG. 34 depicts the hook member 68 operated from a hydraulic cylinder 69 attached to the outside of the transporter 12. In alternative arrangements, the hook members 68 may be operated from hydraulic cylinders 69 located within the transporter 12; these alternative arrangements are particularly useful because, it is avoided that dirt and water enter in contact with the hydraulic system 121.

Figure 19:
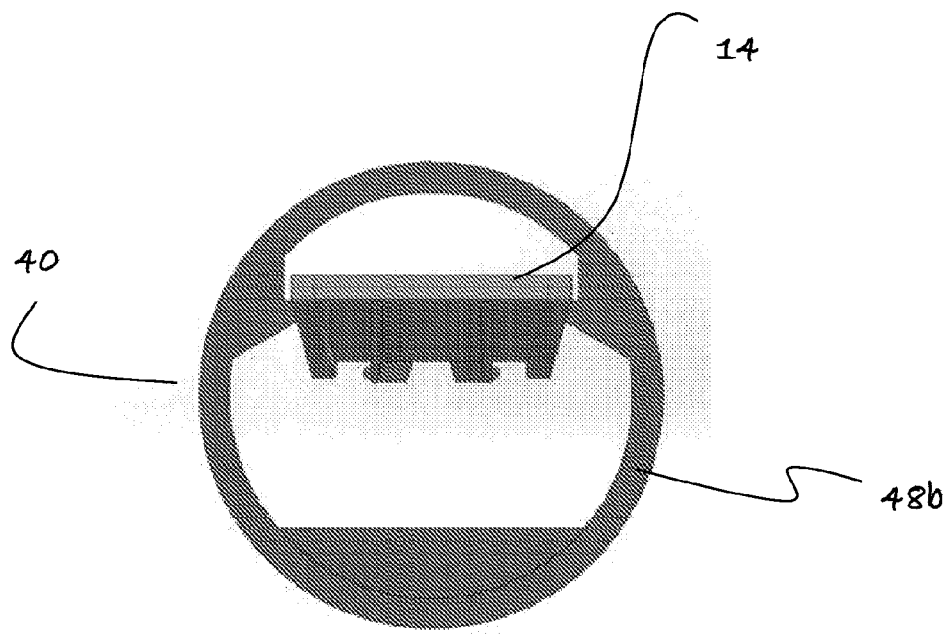
FIGS. 19 to 22 are front views of the tray within the unloading rotator depicting rotation of the unloading rotator for tilting of the tray from the untitled condition to the tilted condition for unloading of the tray.
Figure 20:
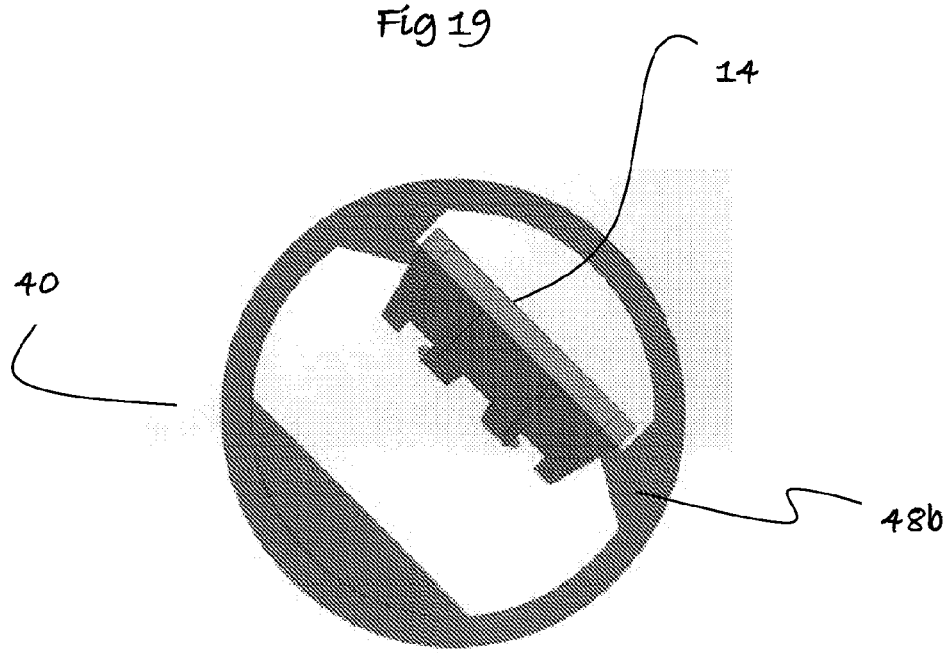
Figure 21:
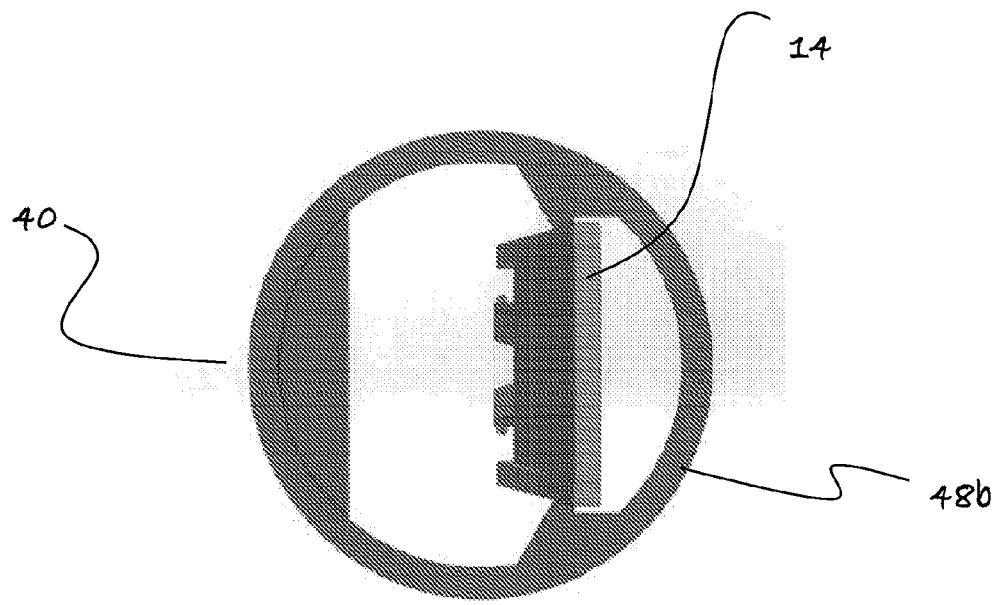
Figure 22:
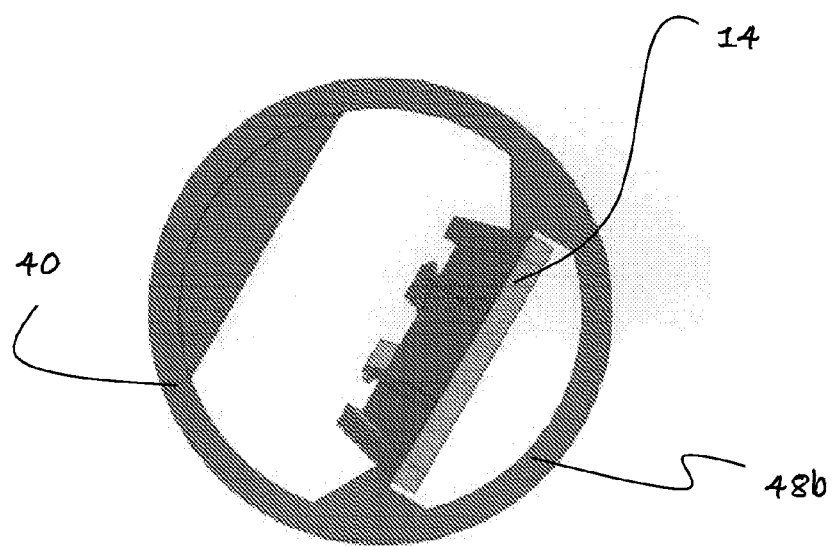
Figure 23:
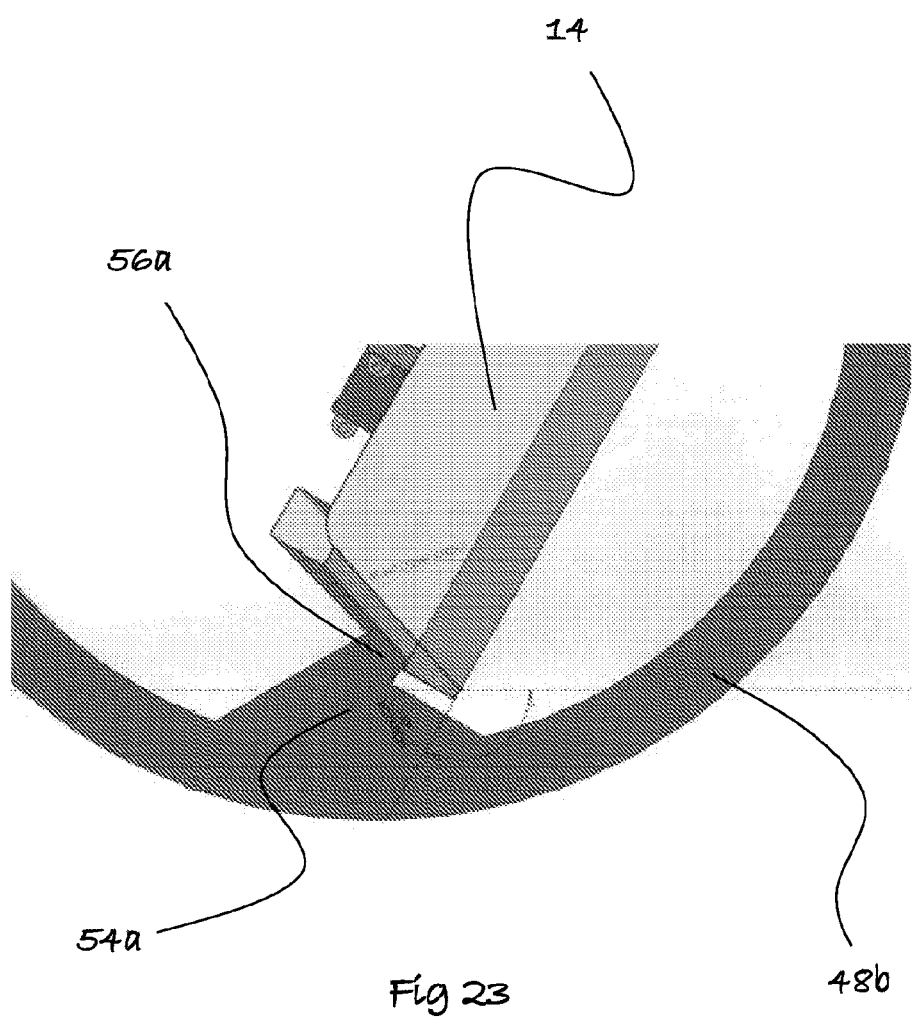
FIG. 23 is a detail of FIG. 22 showing the tray in tilted condition.

Referring now to FIGS. 17 to 22, FIGS. 17 to 22 illustrates the process of tilting of the tray 14 for unloading of the cargo contained in the tray 14. As shown in FIGS. 17 to 22, the process of unloading the tray 14 comprises rotating the rotator 40 from the initial position after the transporter 12 has been moved from below the tray 14 and the tray 14 is in horizontal condition as shown in FIG. 19 to the final position shown in FIG. 22 when the tray 14 is in the tilted condition.

In the particular arrangement shown in the figures, for unloading of the tray 14 to occur, the rotator 40 is rotated 120 degrees clockwise from the position when the tray 14 is untilted condition (see FIG. 19) locating the tray 14 at the dump angle of 48.66 degrees with respect to the horizontal, which is substantially parallel to the ground onto which the access and exit road are mounted.

Figure 31:
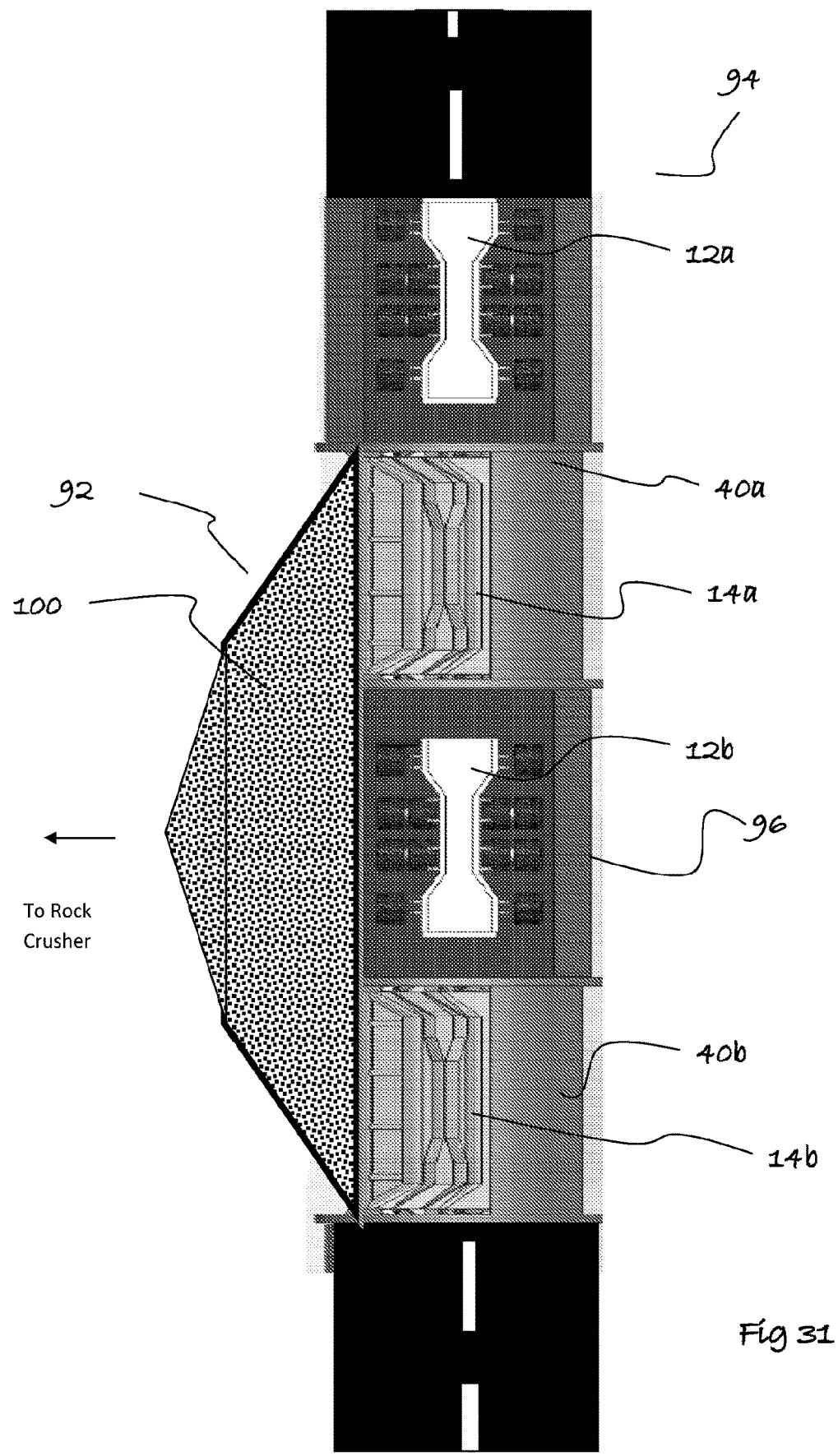
FIG. 31 is a top view of a particular arrangement of a material handling system in accordance with the present embodiment of the invention.

As the tray 14 is tilted, the load 100 (such as rocks) is unloaded and, in accordance with a particular arrangement, dumped into a chute 92 for delivery to rock crushers—see FIG. 31.

Referring now to FIG. 31, FIG. 31 shows a particular arrangement of a system for material handling in accordance with the present embodiment.

As shown in FIG. 31, the material handling system comprises an unloading assembly 94 having a plurality of rotators 40 in tandem arrangement with a road section 96 located between neighbouring rotators 40 (such as rotator 40a and rotator 40b). This particular arrangement is particularly advantageous because it defines a circuit of a plurality of transporters 12 traveling from the loading location comprising the load to be picked up by the transporters 12 to the unloading location comprising the unloading assembly 94.

Further, the system also comprises a material handling unit 98. In the particular arrangement shown in FIG. 32, the material handling unit 98 comprises at least one chute 92 for receiving the load 100 of one tray 14) and transfer the load 100 to the rock crusher station.

As shown in FIG. 31, the chutes 92 are located on the side of the trays 14 permitting, as the trays 14 are tilted, transferring of the load 100 to the chutes 92 for delivery to the rock crushers.

The material handling system in accordance with the present embodiment of the invention permits particular transporters 12 (such as 12b), after its tray 14b has been lifted, to move to road section 96 and stand there until the tray 14a, located forefront of the road section 96 and secured to rotator 40a, has been unloaded and returned to the horizontal condition. When the tray 14a is in the horizontal condition, the transporter 12b may be moved into the rotator 14a for picking up the tray 14a and exit the rotator 14a for moving towards the loading location for picking up another load 100 and return to the unloading location comprising the unloading assembly 94. In an arrangement, the transporters 12 are autonomous vehicles.

Figure 32:
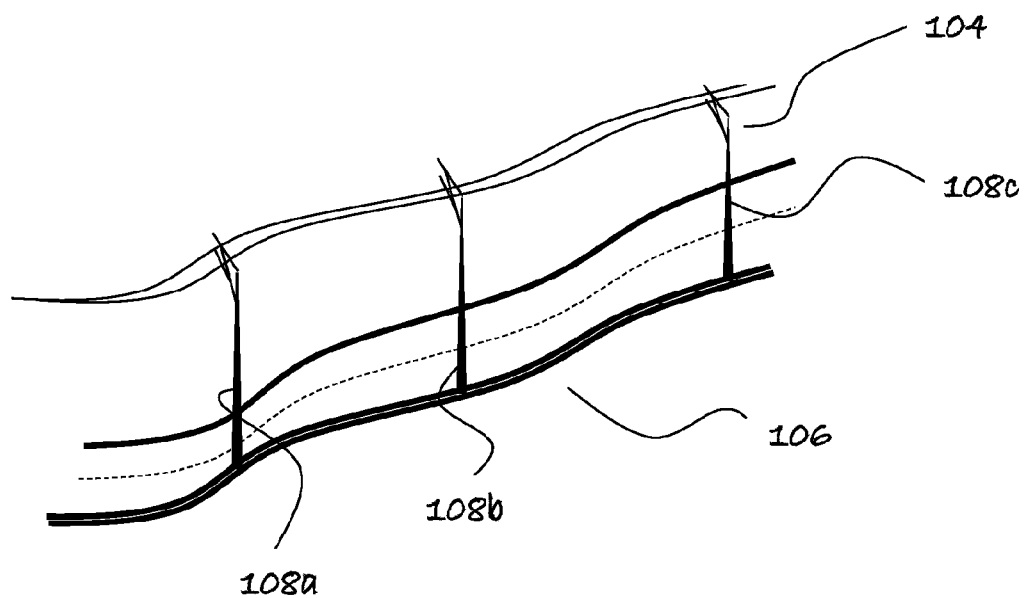
FIG. 32 is top side perspective view of the road section comprising a trolley system.
Figure 33:
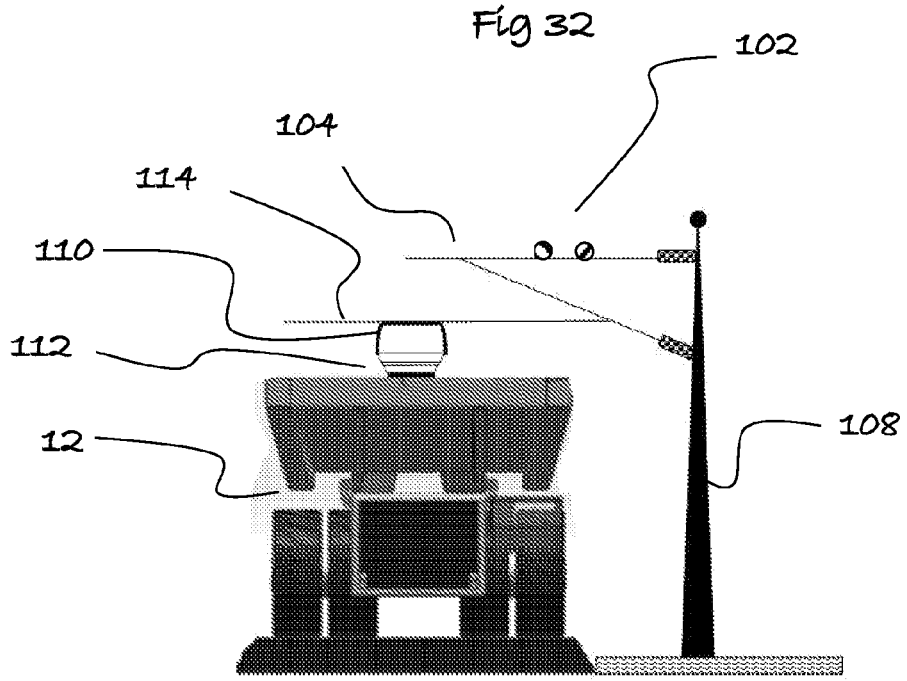
FIG. 33 is a front view of a load carrying vehicle adapted to receive electric energy from an overhead electric line of the trolley system depicted in FIG. 32.

Referring now to FIGS. 32 and 33, FIGS. 32 and 33 relate to a trolley system 102 incorporated in the material handling system in accordance with the present embodiment of the invention.

According to a particular arrangement, the material handling system in accordance with the present embodiment of the invention, comprises a trolley system 102 with an overhead electric line 104 for supplying electric energy to the transporters 12; in particular, the electric energy is delivered to their electric motors. In this manner, the use of combustion engines in transporters 12 (running, for example, on diesel fuel) could be avoided; thus, fuel consumption, noise and emissions are reduced.

As an example, the electric energy could be delivered within a particular road section 106 of the road defining the circuit on which the transporters 12 travel during loading and unloading of the load. In particular, one particular road section of the circuit could comprise the overhead electric line 104 with objective of delivering only within that particular road section 106 the electric energy.

In a particular arrangement, the particular road section 106 could be an uphill road section of the circuit around which the transporters 12 travel. The fact that the overhead electric lines 104 are provided at an uphill road section is particularly advantageous; because, when the transporters 12 travel uphill more power is required for travelling at the same speed than when travelling downhill or on a horizontal section of the road of the circuit. By providing additional power to the transporters 12, the transporters 12 could maintain the speed at reasonable levels while traveling uphill.

In alternative arrangements, the downhill sections of the road could also include overhead electric lines 104, or the overhead electric lines 104 could cover the entire road of the circuit for supplying to the transporters 12 continuously electric energy during the full journey between the loading and unloading zones.

In particular, the material handling system comprises a trolley system 102 comprising a catenary system having the overhead electric lines 104 supported on masts 108 arranged in a spaced apart relationship with respect to each other, traction substations, a trolley mast-mounted high voltage supply, and a pantograph 110 and trolley box 112 mounted on each transporter 12.

The trolley boxes 112 are mounted on each transporter 12 for receiving the electric energy collected by the pantographs 112 that are contacting the registration arm 114 of the overhead electric lines 104 and delivering the electric energy to the drive system of the transporter 12. The drive system has drivemotors operatively connected to the non-idle wheels of the transporters.

The electric energy running through the overhead lines 104 can be generated by a power station in remote locations with respect to the trolley system 12.

Collection of the electric energy for the electric motor system of each transporter 12 is done via a pantograph 112 that is mounted on an upper surface of each transporter 12. The pantographs 112 are adapted to collect the electric energy running through the overhead electric lines 104 for delivery to the electric motor. In particular, the pantographs 112 comprise a contact member 110 biased such that an upper end of the contact member 110 is in continuous contact with the registration arm for collection of the electric energy running through the electric lines.

Further, it should be appreciated that the scope of the invention is not limited to the scope of the embodiments disclosed. For example, in alternative arrangements of the invention, the load carrying vehicle may comprise an open top ISO container releasable attached to a load carrying platform of a truck such as a heavy-duty truck. In an arrangement, the ISO container may be releasably attached to the load-carrying platform of the truck via a plurality of twist locks.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. An unloading apparatus for unloading a load contained in a tray of a load carrying vehicle having a platform defining an upper surface adapted to releasably receive the tray, the unloading apparatus comprising a rotator having a support surface for parking of the load carrying vehicle comprising a body having a platform defining an upper surface and a wheel arrangement attached to lower section of the platform, the tray being releasably attached to the upper surface of the platform, and a plurality of frames arranged in a spaced apart relationship with respect to each other along the support surface, the frames being adapted to secure the tray to the rotator and lifting the tray from the platform, and means for rotating the rotator about a longitudinal axis of the tray for unloading of the load.

2. The unloading apparatus according to claim 1 the rotator further comprises a clamp lifting system for lifting the tray and securing the tray to the rotator, wherein the clamp lifting system comprises a plurality of clamp lifting mechanisms, each mechanism being adapted to secure one of the corners of the tray to a section of a frame.

3. The unloading apparatus according to claim 1, wherein the load carrying vehicle comprises pivotable hooks, the tray having side and end walls having upper ends defining an open upper end for receiving a load for storage in the tray, the open end comprising front and rear corners, wherein the front and rear corners are adapted to receive jaws of a lifting mechanism for lifting the tray from the platform and tilting the tray.

4. The unloading apparatus according to claim 3, wherein the corners of the tray are secured to upper arc sections of the frames.

5. The unloading apparatus according to claim 4, wherein the upper arc sections comprise extensions extending radially from the inner periphery of the upper arc sections.

6. The unloading apparatus according to claim 2, wherein each clamp lifting mechanism comprises a jaw rotatably attached to the frame of the rotator.

7. The unloading apparatus according to claim 6, wherein the clamp lifting mechanisms are attached at a location such that when the clamp lifting mechanisms are moved in unison from the open condition to the closed condition, the jaws of the clamp lifting mechanisms moves towards the upper arc section of the frame in order to lift the tray from the platform.

8. The unloading apparatus according to claim 5, wherein the extensions extending radially from the inner periphery of the upper arc sections comprise indentations which are adapted to receive portions of the corners of the tray.

9. The unloading apparatus according to claim 1, wherein the rotator comprises an entry and an exit for, respectively, receiving and permitting exit of the load carrying vehicle.

10. An unloading assembly having a plurality of unloading apparatus arranged in a tandem relationship with a road section located between neighbouring rotators, wherein the unloading apparatus is for unloading a load contained in a tray of a load carrying vehicle having a platform defining an upper surface adapted to releasably receive the tray, the unloading apparatus comprising a rotator having a support surface for parking of the load carrying vehicle comprising a body having a platform defining an upper surface and a wheel arrangement attached to lower section of the platform, the tray being releasably attached to the upper surface of the platform, and a plurality of frames arranged in a spaced apart relationship with respect to each other along the support surface, the frames being adapted to secure the tray to the rotator and lifting the tray from the platform, and means for rotating the rotator about a longitudinal axis of the tray for unloading of the load.

11. The unloading assembly according to claim 10, wherein the support surface is adapted for receiving either the load carrying vehicle or the platform to permit removal or mounting of the tray with respect to the platform.

12. A system for handling materials located at a loading location to be moved to an unloading location, the system comprising an unloading assembly and at least one load carrying vehicle comprising a body having a platform defining an upper surface, a wheel arrangement attached to lower section of the platform, and a tray being releasably attached to the upper surface of the platform, the unloading assembly having
 a plurality of unloading apparatus arranged in a tandem relationship with a road section located between neighbouring rotators, wherein
 the unloading apparatus is for unloading a load contained in a tray of a load carrying vehicle having a platform defining an upper surface adapted to releasably receive the tray, the unloading apparatus comprising a rotator having a support surface for parking of the load carrying vehicle comprising a body having a platform defining an upper surface and a wheel arrangement attached to lower section of the platform, the tray being releasably attached to the upper surface of the platform, and a plurality of frames arranged in a spaced apart relationship with respect to each other along the support surface, the frames being adapted to secure the tray to the rotator and lifting the tray from the platform, and means for rotating the rotator about a longitudinal axis of the tray for unloading of the load.

13. The system according to claim 12, wherein the load carrying vehicle comprises pivotable hooks, the tray having side and end walls having upper ends defining an open upper end for receiving a load for storage in the tray, the open end comprising front and rear corners, wherein the front and rear corners are adapted to receive jaws of a lifting mechanism for lifting the tray from the platform and tilting the tray.

14. The system for handling materials according to claim 12, wherein the system further comprises a material handling unit.

15. The system for handling materials according to claim 14, wherein the material handling unit comprises at least one chute, wherein each chute is adapted to receive material contained in one tray for moving the material to a processing station.

16. The system for handling materials according to claim 15 wherein the processing station comprises a rock crusher station.

17. The system for handling materials according to claim 12, wherein the load carrying vehicle comprises a transporter.

18. The system for handling materials according to claim 12, wherein the system further comprises a trolley system comprising a catenary system having overhead electric lines supported on masts arranged in a spaced apart relationship with respect to each other, traction substations, a trolley mast-mounted high voltage supply, and a pantograph and trolley box mounted on each load carrying vehicle.

19. The system for handling materials according to claim 12, wherein the trolley boxes are mounted on each load carrying vehicle for receiving the electric energy collected by the pantographs that are making contact with the overhead electric lines and deliver the electric energy to at least one electric motor of each load carrying vehicle via its trolley box.

20. The system for handling materials according to claim 19, wherein the trolley system extends to at least one road section of the circuit extending between the loading and unloading stations.

21. The system for handling materials according to claim 15, wherein the road section comprises an uphill road section.

22. A method for handling of load, for moving the load using a load carrying vehicle from a first location to a second location, the load carrying vehicle comprising a body having a platform defining an upper surface, a wheel arrangement attached to lower section of the platform, and a tray being releasably attached to the upper surface of the platform, the method comprises the steps:
 a. loading, at the first location, the load onto a first tray while mounted on the platform of the load carrying vehicle;
 b. moving the load carrying vehicle comprising the tray mounted thereon to the second location comprising at least one unloading apparatus for unloading a load contained in a tray of a load carrying vehicle having a platform defining an upper surface adapted to releasably receive the tray, the unloading apparatus comprising
- a rotator having a support surface for parking of the load carrying vehicle comprising a body having a platform defining an upper surface and a wheel arrangement attached to lower section of the platform, the tray being releasably attached to the upper surface of the platform, and
- a plurality of frames arranged in a spaced apart relationship with respect to each other along the support surface, the frames being adapted to secure the tray to the rotator and lifting the tray from the platform, and means for rotating the rotator about a longitudinal axis of the tray for unloading of the load; and c. removing the tray from the platform of the load carrying vehicle and unloading the tray via the rotator.

23. The method according to claim 22, wherein method further comprises the steps of mounting a second tray onto the load carrying vehicle with the intention of loading the second tray with load at the first location or another location for delivery to the second location or another third location.

24. A tray when being unloaded using an unloading apparatus, the tray being adapted for attachment to a platform of a load carrying vehicle having hook members pivotally attached to sides of the platform, the tray comprising the tray having
side walls having upper ends comprising side beams and end walls having a plurality of pin members on each of the side wall of each tray, the pin members are adapted to receive the hook members for releasably attaching the tray to the platform wherein the walls end, having upper ends comprising end beams, the side and end beams being joined together defining an open upper end for receiving a load for storage in the tray, the open end comprising front and rear corners adapted to receive jaws of a lifting mechanism for lifting the tray from the platform and tilting the tray, wherein the side beams extend beyond the corners defining beam extensions to receive the jaws of the lifting mechanism such that the beam extensions are sandwiched between the jaws and particular arc sections of frames of the rotator, wherein the unloading apparatus is for unloading a load contained in a tray of a load carrying vehicle having a platform defining an upper surface adapted to releasably receive the tray, the unloading apparatus comprising a rotator having a support surface for parking of the load carrying vehicle comprising a body having a platform defining an upper surface and a wheel arrangement attached to lower section of the platform, the tray being releasably attached to the upper surface of the platform, a plurality of frames arranged in a spaced apart relationship with respect to each other along the support surface, the frames being adapted to secure the tray to the rotator and lifting the tray from the platform, and means for rotating the rotator about a longitudinal axis of the tray for unloading of the load.

25. The tray according to claim 24, wherein the extensions extending radially from the inner periphery of the upper arc sections comprise indentations which are adapted to receive portions of the beam extensions of the tray.

26. A load carrying vehicle comprising a tray, and a body having a platform defining an upper surface for receiving the tray, a wheel arrangement attached to lower section of the platform, and hook members pivotally attached to sides of the platform, the tray being releasably attached to the upper surface of the platform, wherein the tray when being unloaded using an unloading apparatus, the tray being adapted for attachment to a platform of a load carrying vehicle having hook members pivotally attached to the sides of the platform, the tray comprising a plurality of pin members on each of the side wall of the trays, the pins are adapted to receive the hook members for releasably attaching the tray to the platform, the tray having side walls having upper ends comprising side beams and end walls having upper ends comprising end beams, the side and end beams being joined together defining an open upper end for receiving a load for storage in the tray, the open end comprising front and rear corners adapted to receive jaws of the lifting mechanism for lifting the tray from the platform and tilting the tray, wherein the side beams extend beyond the corners defining beam extensions to receive the jaws of the lifting mechanism such that the beam extensions are sandwiched between the jaws and particular arc sections of frames of a rotator, wherein the unloading apparatus is for unloading a load contained in a tray of a load carrying vehicle having a platform defining an upper surface adapted to releasably receive the tray, the unloading apparatus comprising a rotator having a support surface for parking of the load carrying vehicle comprising a body having a platform defining an upper surface and a wheel arrangement attached to lower section of the platform, the tray being releasably attached to the upper surface of the platform, and a plurality of frames arranged in a spaced apart relationship with respect to each other along the support surface, the frames being adapted to secure the tray to the rotator and lifting the tray from the platform, and means for rotating the rotator about a longitudinal axis of the tray for unloading of the load.

27. The load carrying vehicle according to claim 26, wherein the body comprises a transporter.

28. The load carrying vehicle according to claim 27, wherein the transporter comprises a chassis for provision of the platform for removably receiving the tray.

29. The load carrying vehicle according to claim 26, wherein actuation of the hook members occurs either from a cabin of the transporter via an operator or the transporter may be computer controlled self-driving transporter, the hook members being computer-controlled.

30. The load carrying vehicle according to claim 29, wherein the transporter comprises a platform having a relative wide extended upper surface permitting receiving a tray having a relatively large surface area.

31. The load carrying vehicle according to claim 30, wherein the tray and platform are configured such that the tray is an integral part of the transporter.

32. The load carrying vehicle according to claim 30, wherein the upper surface of the platform of the transporter is located at a relative low height with respect to the ground surface.

33. The load carrying vehicle according to claim 26, wherein the tray has a relatively large surface area and relative low side walls.

34. The load carrying vehicle according to claim 26, further comprising at least one electric motor, a pantograph and trolley boxes mounted on each transporter, the pantograph being adapted to contact overhead electric lines for receiving the electric energy and deliver the electric energy to the trolley boxes for delivery to the electric motor for driving of the load carrying vehicle.

\* \* \* \* \*